(12) United States Patent
Yavuz et al.

(10) Patent No.: US 8,611,822 B2
(45) Date of Patent: Dec. 17, 2013

(54) WIRELESS COMMUNICATION SYSTEMS WITH FEMTO CELLS

(75) Inventors: Mehmet Yavuz, San Diego, CA (US); Sanjiv Nanda, Ramona, CA (US); Vansh Pal Singh Makh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 12/502,084

(22) Filed: Jul. 13, 2009

(65) Prior Publication Data

US 2010/0015921 A1  Jan. 21, 2010

Related U.S. Application Data

(60) Provisional application No. 61/080,984, filed on Jul. 15, 2008.

(51) Int. Cl.
 *H04B 1/00* (2006.01)
(52) U.S. Cl.
 USPC ............... 455/63.1; 455/67.11; 455/67.13; 455/436; 455/439; 370/331; 370/332
(58) Field of Classification Search
 None
 See application file for complete search history.

(56) References Cited

U.S. PATENT DOCUMENTS

| | | | |
|---|---|---|---|
| 5,920,819 A * | 7/1999 | Asanuma | 455/447 |
| 7,006,828 B1 | 2/2006 | Czaja et al. | |
| 7,068,626 B2 * | 6/2006 | Zeira et al. | 370/332 |
| 2004/0127259 A1 * | 7/2004 | Matsunaga | 455/560 |

(Continued)

FOREIGN PATENT DOCUMENTS

| | | |
|---|---|---|
| CN | 1141102 A | 1/1997 |
| EP | 1575319 A2 | 9/2005 |

(Continued)

OTHER PUBLICATIONS

3GPP TR 25.820 V8.1.0, 3rd Generation Partnership Project; Technical Specification Group Radio Access Networks; 3G Home NODEB Study Item Technical Report (Release 8), vol. 25.820, Nr:V8.1.0 ,pp. 1-37, May 1, 2008, XP002547670.

(Continued)

*Primary Examiner* — Zhiyu Lu

(57) ABSTRACT

Systems and methods for avoiding interference signals sent by a femto node in a wireless communication system are described herein. In one embodiment, the method comprises establishing a communication link between a first transceiver and a base station. The base station is configured to provide wireless communication coverage within a first area. The method further comprises detecting by the first transceiver a femto signal generated by the femto node. The femto node is configured to provide wireless communication coverage within a second area to at least a second transceiver. The second transceiver is different from the first transceiver. The second area is smaller than the first area. The method further comprises identifying information indicative of a signal strength of the femto signal. The method further comprises transmitting a first message in response to detecting the femto signal, the first message comprising information identifying the femto node and the information indicative of the signal strength of the femto signal to the base station over a first frequency carrier. The method further comprises receiving a second message from the base station. The second message comprises information indicative of an instruction to communicate over a second carrier frequency. The method further comprises communicating with the base station over a second frequency carrier in response to the second message.

44 Claims, 12 Drawing Sheets

(56) References Cited

U.S. PATENT DOCUMENTS

| | | | |
|---|---|---|---|
| 2007/0191013 A1* | 8/2007 | Gunnarsson et al. | 455/438 |
| 2009/0046632 A1 | 2/2009 | Nanda et al. | |
| 2009/0047968 A1* | 2/2009 | Gunnarsson et al. | 455/446 |
| 2010/0177654 A1* | 7/2010 | Charbit et al. | 370/252 |
| 2010/0178921 A1* | 7/2010 | Aqvist et al. | 455/436 |
| 2011/0014920 A1* | 1/2011 | Nylander et al. | 455/442 |

FOREIGN PATENT DOCUMENTS

| | | |
|---|---|---|
| EP | 1589776 A1 | 10/2005 |
| JP | 2003506960 A | 2/2003 |
| JP | 2006287357 A | 10/2006 |
| JP | 2007129405 A | 5/2007 |
| WO | WO2005043948 A2 | 5/2005 |
| WO | 2009004442 A2 | 1/2009 |
| WO | 2009026157 | 2/2009 |
| WO | 2009099363 A1 | 8/2009 |

OTHER PUBLICATIONS

International Search Report and Written Opinion—PCT/US2009/050581, International Search Authority—European Patent Office—Nov. 24, 2009.

"3rd Generation Partnership Project; Technical Specification Group Radio Access Networks; 3G Home NODEB Study Item Technical Report (Release 8); 3GPP TR 25.820 V8.0.0" 3rd Generation Partnership Project (3GPP), Mar. 1, 2008, pp. 1-37.

Taiwan Search Report—TW098123973—TIPO—Jul. 24, 2012.

Yavuz M., et al., "Femtocell Interference Management Methods and Performance Results", 3GPP2 Meeting Contribution, Jun. 16, 2008, C30-20080616-016R1.

* cited by examiner

WIRELESS COMMUNICATION SYSTEMS WITH FEMTO CELLS

CROSS REFERENCE TO RELATED APPLICATION(S)

This application claims the benefit of U.S. Provisional Application No. 61/080,984, filed Jul. 15, 2008, the entire content of which is incorporated herein by reference.

BACKGROUND

1. Field of the Invention

The present application relates generally to wireless communications, and more specifically to systems and methods to avoid interference from a femto station.

2. Relevant Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In addition to mobile phone networks currently in place, a new class of small base stations has emerged, which may be installed in a user's home and provide indoor wireless coverage to mobile units using existing broadband Internet connections. Such personal miniature base stations are generally known as home access point base stations, or, alternatively, Home Node B (HNB) or femto nodes. Typically, such miniature base stations are connected to the Internet and the mobile operator's network via a DSL router or a cable modem. These femto nodes, however, may interfere with communication between traditional larger base stations and mobile devices, such as mobile phones. Adjusting the method in which femto nodes communicate to minimize interference may be desirable.

SUMMARY OF THE INVENTION

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Description of the Preferred Embodiments" one will understand how the features of this invention provide advantages that include concurrent communication over multiple air interfaces.

One embodiment of the disclosure provides a method of avoiding interference signals sent by a femto node in a wireless communication system. The method comprises establishing a communication link between a first transceiver and a base station. The base station is configured to provide wireless communication coverage within a first area. The method further comprises detecting by the first transceiver a femto signal generated by the femto node. The femto node is configured to provide wireless communication coverage within a second area to at least a second transceiver. The second transceiver is different from the first transceiver. The second area is smaller than the first area. The method further comprises identifying information indicative of a signal strength of the femto signal. The method further comprises transmitting a first message in response to detecting the femto signal, the first message comprising information identifying the femto node and the information indicative of the signal strength of the femto signal to the base station over a first frequency carrier. The method further comprises receiving a second message from the base station. The second message comprises information indicative of an instruction to communicate over a second carrier frequency. The method further comprises communicating with the base station over a second frequency carrier in response to the second message.

A further embodiment of the disclosure provides a wireless communication apparatus comprising a transceiver configured to communicate with a base station. The base station is configured to provide wireless communication coverage within a first area. The apparatus further comprises a signal detector configured to detect a femto signal generated by a femto node. The femto node is configured to provide wireless communication coverage within a second area. The second area is smaller than the first area. The signal detector is further configured to identify information indicative of a signal strength of the femto signal. The apparatus further comprises a message generator configured to generate a first message in response to detecting the femto signal. The first message comprises information identifying the femto node and the information indicative of the signal strength of the femto signal. The transceiver is further configured to transmit the first message to the base station over a first frequency carrier. The apparatus further comprises a handoff controller configured to receive a second message from the base station. The second message comprises information indicative of an instruction to communicate over a second carrier frequency. The transceiver is further configured to communicate with the base station over a second frequency carrier in response to the second message.

Yet a further embodiment of the disclosure provides a wireless communication apparatus comprising means for communicating with a base station. The base station is configured to provide wireless communication coverage within a first area. The apparatus further comprises means for detecting a femto signal generated by a femto node. The femto node is configured to provide wireless communication coverage within a second area. The second area is smaller than the first area. The apparatus further comprises means for identifying information indicative of a signal strength of the femto signal. The apparatus further comprises means for generating a first message in response to detecting the femto signal. The first message comprises information identifying the femto node and the information indicative of the signal strength of the femto signal. The apparatus further comprises means for transmitting the first message to the base station over a first frequency carrier. The apparatus further comprises means for receiving a second message from the base station. The second message comprises information indicative of an instruction to communicate over a second carrier frequency. The communication means is further configured to communicate with the base station over a second frequency carrier in response to the second message.

Yet a further embodiment of the disclosure provides a computer program product, comprising computer-readable medium. The computer-readable medium comprises code for causing a computer to establish a communication link between a first transceiver and a base station. The base station is configured to provide wireless communication coverage within a first area. The computer-readable medium further comprises code for causing a computer to detect by the first transceiver a femto signal generated by the femto node. The femto node is configured to provide wireless communication coverage within a second area to at least a second transceiver that is different from the first transceiver. The second area is smaller than the first area. The computer-readable medium further comprises code for causing a computer to identify information indicative of a signal strength of the femto signal. The computer-readable medium further comprises code for causing a computer to transmit a first message in response to detecting the femto signal, the first message comprising information identifying the femto node and the information indicative of the signal strength of the femto signal to the base station over a first frequency carrier. The computer-readable medium further comprises code for causing a computer to receive a second message from the base station. The second message comprises information indicative of an instruction to communicate over a second carrier frequency. The computer-readable medium further comprises code for causing a computer to communicate with the base station over a second frequency carrier in response to the second message.

DESCRIPTION OF THE PREFERRED EMBODIMENTS

Figure 1:
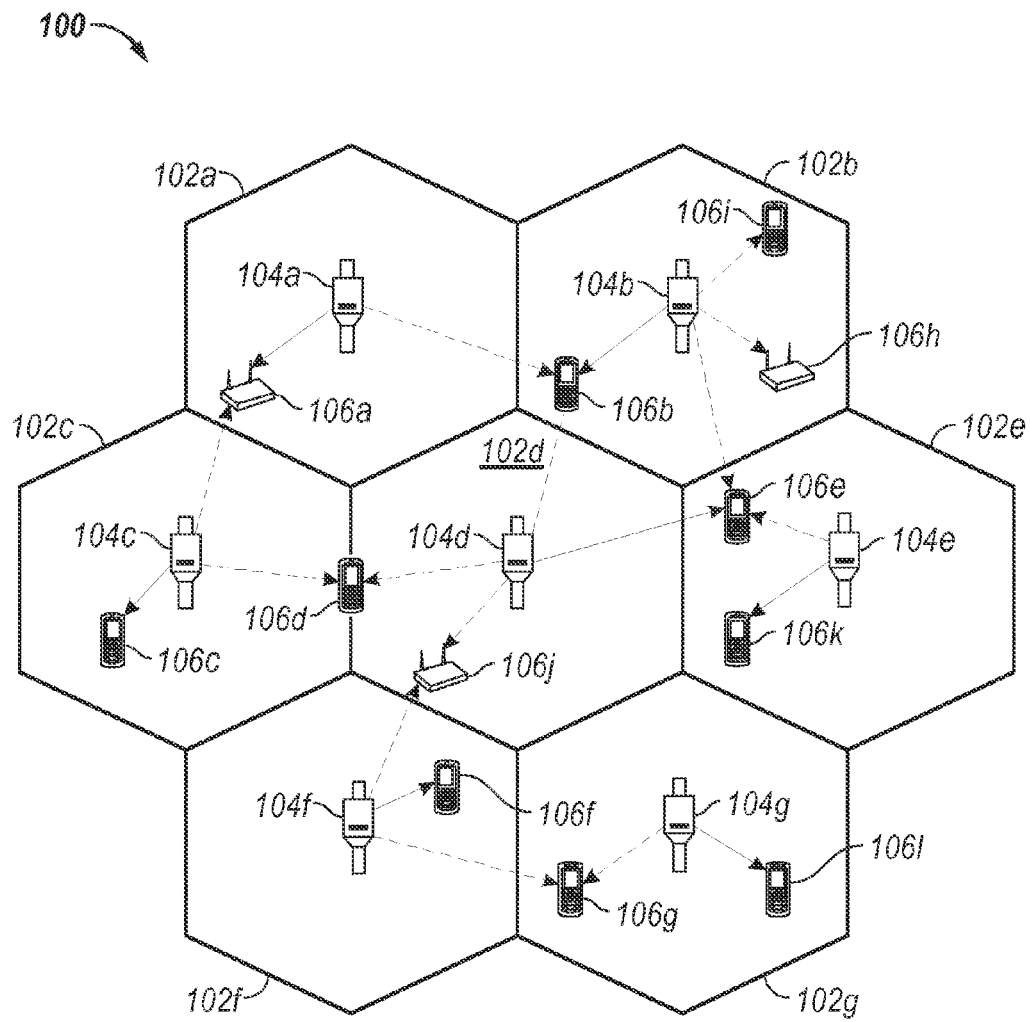
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104, such as, for example, nodes 104a-104g. Each node 104 may provide communication coverage to a corresponding cell 102. The nodes 104 may interact with a plurality of access terminals (ATs), such as, for example, ATs 106a-106l.

Each AT 106 may communicate with one or more nodes 104 on a forward link (FL) and/or a reverse link (RL) at a given moment. A FL is a communication link from a node to an AT. A RL is a communication link from an AT to a node. The nodes 104 may be interconnected, for example, by appropriate wired or wireless interfaces and may be able to communicate with each other. Accordingly, each AT 106 may communicate with another AT 106 through one or more nodes 104. For example, the AT 106*j* may communicate with the AT 106*h* as follows. The AT 106*j* may communicate with the node 104*d*. The node 104*d* may then communicate with the node 104*b*. The node 104*b* may then communicate with the AT 106*h*. Accordingly, a communication is established between the AT 106*j* and the AT 106*h*.

The wireless communication network 100 may provide service over a large geographic region. For example, the cells 102*a*-102*g* may cover only a few blocks within a neighborhood or several square miles in a rural environment. In one embodiment, each cell may be further divided into one or more sectors (not shown).

As described above, a node 104 may provide an access terminal (AT) 106 access within its coverage area to a communications network, such as, for example the internet or a cellular network.

An AT 106 may be a wireless communication device (e.g., a mobile phone, router, personal computer, server, etc.) used by a user to send and receive voice or data over a communications network. An access terminal (AT) may also be referred to herein as a user equipment (UE), as a mobile station (MS), or as a terminal device. As shown, ATs 106*a*, 106*h*, and 106*j* comprise routers. ATs 106*b*-106*g*, 106*i*, 106*k*, and 106*l* comprise mobile phones. However, each of ATs 106*a*-106*l* may comprise any suitable communication device.

Figure 2:
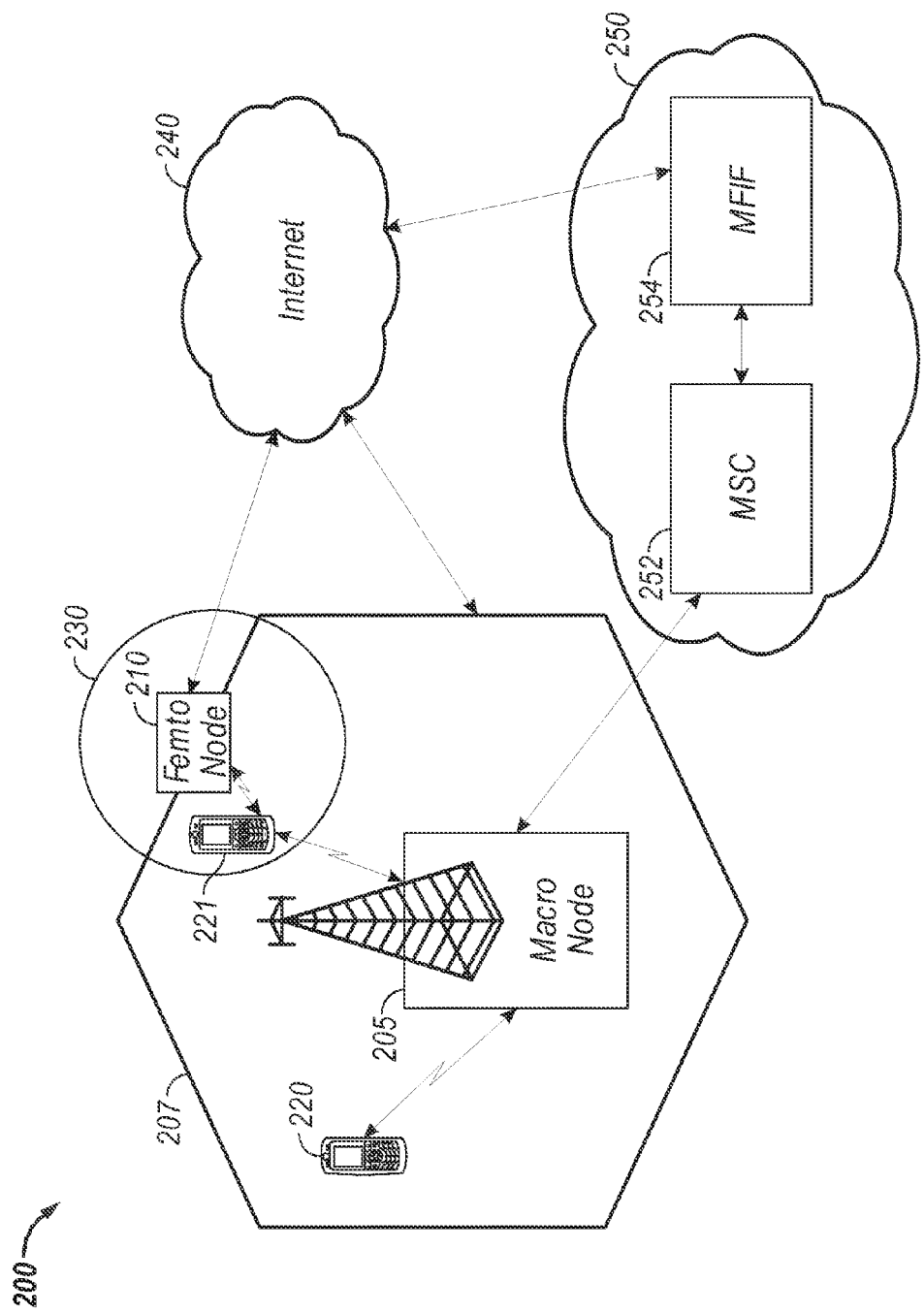
FIG. 2 illustrates the exemplary interoperations of two or more communication networks.

FIG. 2 illustrates exemplary interoperations of two or more communication networks. It may desirable for an AT 220 to transmit information to and receive information from another AT such as AT 221. FIG. 2 illustrates a manner in which the AT 220 may communicate with the AT 221. As shown in FIG. 2, the macro node 205 may provide communication coverage to access terminals within a macro area 207. For example, the AT 220 may generate and transmit a message to the macro node 205. The message may comprise information related to various types of communication (e.g., voice, data, multimedia services, etc.). The AT 220 may communicate with the macro node 205 via a wireless link.

The macro node 205 may also communicate with a mobile switching center (MSC), such as the MSC 252 operating in the communication network 250. For example, the macro node 205 may transmit the message received from the AT 220 to the MSC 252. Generally, the MSC 252 may facilitate communication between the AT 220 and the AT 221 by first receiving the message received from the AT 220 via the macro node 205. The MSC 252 may then transmit the message to a macro femto internetworking function (MFIF), such as the MFIF 254, for eventual transmission to the AT 221 via a femto node. The macro node 205 and the MSC 252 may communicate via a wired link. For example, a direct wired link may comprise a fiber optic or Ethernet link. The macro node 205 and the MSC 252 may be co-located or deployed in different locations.

The MSC 252 may also communicate with the macro femto internetworking function (MFIF) 254. Generally, the MFIF 254 may facilitate communication between the 220 and the AT 221 by first receiving the message from the AT 220 via the macro node 205 and the MSC 252. The MFIF 254 may then route the message to a femto node for transmission to the AT 221. The MSC 252 and the MFIF 254 may communicate via a direct wired link as described above. The MSC 252 and the MFIF 254 may be co-located or may be deployed in different locations.

The MFIF 254 may also communicate with the Internet 240 (and/or another appropriate wide area network). Generally, the Internet 240 may facilitate communication between the AT 220 and the AT 221 by first receiving the message from the AT 220 via the macro node 205, the MSC 252, and the MFIF 254. The Internet 240 may then transmit the message to a femto node, such as the femto node 210 for transmission to the AT 221. The MFIF 254 may communicate with the Internet 240 via a wired or wireless link as described above.

The Internet 240 may also communicate with femto nodes, such as the femto node 210. The femto node 210 may facilitate communication between the AT 220 and the AT 221 by providing communication coverage for the AT 221 within a femto area 230. For example, the femto node 210 may receive the message originating at the AT 220 via the macro node 205, the MSC 252, the MFIF 254, and the Internet 240. The femto node 210 may then transmit the message to the AT 221 in the femto area 230. The femto node 210 may communicate with the AT 221 via a wireless link.

As described above, the macro node 205, the MSC 252, the MFIF 254, the Internet 240, and the femto node 210 may interoperate to form a communication link between the AT 220 and the AT 221. For example, the AT 220 may transmit generate and transmit the message to the macro node 205. The macro node 205 may then transmit the message to the MSC 252. The MSC 252 may subsequently transmit the message to the MFIF 254. The MFIF 254 may then transmit the message to the Internet 240. The Internet 240 may then transmit the message to the femto node 210*b*. The femto node 210 may then transmit the message to the AT 221. Similarly, the reverse path may be followed from the AT 221 to the AT 220.

In one embodiment, the femto node 210 may be deployed by individual consumers and placed in homes, apartment buildings, office buildings, and the like. The femto node 210 may communicate with the ATs in a predetermined range (e.g., 100 m) of the femto node 210 utilizing a predetermined cellular transmission band. In one embodiment, the femto node 210 may communicate with the Internet 240 by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, or other link. In another embodiment, the femto node 210 may communicate with the MFIF 254 via a direct link.

Although the femto node 210 is configured to communicate with multiple ATs (e.g., ATs 220, 221), a consumer may desire only his or her own traffic to be carried by a private IP connection connected to the femto node 210. For example, the consumer may wish to preserve IP bandwidth for their own use, rather than for use by alien ATs. Therefore, the femto node 210 may be configured to allow communication only with a single AT or group of ATs. The choice of which ATs to allow communication with may be determined by the user. Traffic from the allowed ATs to the femto node 210 is then routed over the consumer's IP connection, whereas traffic from other ATs is blocked. Consequently, although the femto node 210 is configured to communicate with any compatible AT, the femto node 210 may be programmed to ignore ATs that are not associated with a particular consumer, service plan, or the like.

In embodiments described in detail below, due to radio frequency (RF) leakage from communications between the femto node 210 and an AT, a significant amount of RF power may leak outside the area controlled by the user (e.g., the residence of the user). The RF leakage may interfere with communication signals sent to and from ATs that are not allowed to communicate with the femto node. For example, the AT 220 may be in a voice call with the macro node 205 and may pass by a house with the femto node 210 inside. The RF leakage from the femto node 210 may cause interference at the AT 220 with the signal received from the macro node 205. In some cases, the interference may even cause dropped calls.

To provide seamless service for ATs passing by femto nodes, certain embodiments of systems and methods described in detail below provide inter-frequency handoff to another frequency where there is no noticeable RF interference. For example, the AT 220 may communicate with the macro node 205 over a first frequency channel f1. The femto node 210 may transmit communications over the same first frequency channel f1, which may interfere with the communications between the AT 220 and the macro node 205. In one embodiment, the macro node 205 may direct the AT 220 to perform an inter-frequency handoff. An inter-frequency handoff is when the AT 220 switches from communicating over a first frequency channel (e.g., first frequency channel f1) to communicating over a different frequency channel (e.g., second frequency channel f2).

In one embodiment, the femto node 210 and/or the macro node 205 may broadcast a pilot signal. A pilot signal may comprise a known reference signal for determining the strength of signals received from the femto node 210 and/or the macro node 205 at an AT (e.g., AT 220). The known reference signal may be compared to the received reference signal to determine signal quality. The strength of signals received from the femto node 210 and/or the macro node 205 may comprise an $E_{cp}/I_o$ ratio (energy of the pilot signal to energy of interfering signals ratio) or a signal-to-noise ratio. The pilot signal may also comprise an offset pseudo noise (PN) short code. The offset PN short code may comprise a code or sequence of numbers that identifies the node and/or the node type (e.g., femto node, macro node, pico node). The offset PN short code may comprise a PN short code with a PN offset applied. The PN offset may indicate the delay from the true network synchronization time applied to a PN short code. In one embodiment, all of the nodes may use the same PN short code. However, a different PN offset may be applied to the PN short code for different nodes. Thus, the PN offset directly correlates to the offset PN short code and the terms "PN offset" and "offset PN short code" may be used interchangeably herein. In one embodiment, the PN offset may be used to identify the type of node (e.g., femto node, macro node, pico node) transmitting the pilot signal. For example, a particular set of PN offsets may be reserved for identifying femto nodes.

In one embodiment, a set of PN offsets may be reserved for use by femto nodes. The macro node 205 may direct the AT 220 to perform an inter-frequency handoff when the AT 220 reports the PN offset of the femto node 210 to the macro node 205. The AT 220 may report the PN offset of one or more received pilot signals in a pilot strength measurement message (PSMM) (or any other suitable reporting mechanism) comprising the PN offsets and/or the strength of one or more received pilot signals. Therefore, when a pilot is detected with a certain PN offset, the AT 220 and/or the macro node 205 may determine if this pilot belongs to a femto node with restricted access or, in the alternative, to a macro node. Further, the AT 220 and/or the macro node 205 may determine when to perform an inter-frequency handoff based on the PSMM. In some such embodiments, an inter-frequency handoff may be performed when the strength of the pilot signal received at the AT 220 from the femto node 210 exceeds a first threshold value. In addition or in the alternative, an inter-frequency handoff may be performed when the strength of the pilot signal received at the AT 220 from the macro node 205 is below a second threshold value. Though the embodiments described herein refer to PSMMs other suitable reporting mechanisms besides PSMMs may be used.

In one embodiment, an inter-frequency handoff is only performed when the AT 220 is an alien AT not known to femto node 210. In some such embodiments, the PSMM message indicates to the macro node 205 a unique identifier of the femto node 210. The macro node 205 may then only direct an inter-frequency handoff as described below when the AT 220 is an alien AT not known to femto node 210. The macro node 205 may determine whether the AT 220 is a registered AT or an alien AT by accessing a database. The database may comprise a list of femto nodes and the ATs associated with each femto node. In one embodiment, the database may be part of one or more computers and/or servers coupled to the communications network 250, such as for example, the MFIF 254. The macro node 205 may access the MFIF 254 via the MSC 252 as described above.

In another embodiment, the number of PN offsets available for use may be smaller than the number of femto nodes within a geographical area. Thus the PN offset alone may not be sufficient to uniquely identify a femto node. For example, 512 unique PN offsets may be set aside for use by femto nodes. However, there may be more than 512 femto nodes deployed within the macro area 207. As a result, multiple femto nodes within the macro area 207 may use the same PN offset.

In order to facilitate with distinguishing between two or more femto nodes 210 using the same PN offset, additional information besides the PN offset of the femto node 210 may be used to uniquely identify the femto node 210. In one example, the femto node 210 may generate and transmit a femto node or access point identification message (APIDM). The femto node 210 may include in the APIDM message an MSC identifier (MSC ID). An MSC ID may be assigned to a femto node to indicate one of a plurality of MFIFs that is associated with the femto node. For example, the MSC ID may comprise a value used by the MSC 252 to determine that the MFIF 254 is associated with the femto node 210, provided that the femto node 210 is assigned an MSC ID identifying the MFIF 254. The MSC 252 may maintain a data structure, e.g., a list or table, which relates MSC ID values to particular MFIFs. Thus, when the MSC 252 receives an MSC ID, the MSC 252 may determine that information should be sent to the MFIF associated with that MSC ID. The APIDM message may also comprise a CELL identifier (CELL ID). A CELL ID may be assigned to a femto node to uniquely identify the femto node from amongst a plurality of femto nodes associated with a particular MFIF. For example, the CELL ID may comprise a value used by the MFIF 254 to uniquely identify the femto node 210 as between the femto node 210 and other femto nodes (not shown) associated with the MFIF 254. The MFIF 254 may maintain a data structure, e.g., a list or table, which relates CELL ID values to particular femto nodes. Thus, when the MFIF 254 receives a CELL ID, the MFIF 254 may determine that information should be sent to the femto node associated with the CELL ID.

As described in detail below, the use of an APIDM message including both an MSC ID and a CELL ID may be sufficient to determine if an AT 220 is registered with a femto node, e.g., the femto node 210. For example, the AT 220 may detect a pilot signal of the femto node 210 comprising the PN offset of the femto node 210. However, the femto node 210 may use the same PN offset as another femto node. Thus, the AT 220 may not be able to identify the femto node 210 as its target by providing the PN offset to the macro node 205. In this example, the femto node 210 may be configured to include identifying information such an MSC ID and a CELL ID in the APIDM message. The AT 220 may receive this APIDM message and extract the MSC ID and CELL ID. The AT 220 may then transmit the MSC ID and CELL ID to the macro node 205. Alternatively, the AT 220 may transmit to the macro node 205 an indication of a detection of the femto node 210. The macro node 205 may then respond to the detection indication by requesting information about the femto node 210 from the AT 220. The AT 220 may then transmit the identifying information including, for example, the MSC ID and the CELL ID to the macro node 205. In either case, the macro node 205 may then transmit the MSC ID and CELL ID to the MSC 252. The MSC 252 may utilize the MSC ID to determine that the CELL ID should be passed to the MFIF 254. The MSC 252 may then send the CELL ID to the MFIF 254. The MFIF 254 may utilize the CELL ID to identify femto node 210 as the detected femto node. Once the femto node 210 is identified as the MFIF 254 may determine if AT 220 is registered with the femto node 2 10. For example, a message originating from the macro node 205 may be passed to the MFIF 254 via the MSC 252. The message may comprise an identifier of the AT 220 (e.g., a phone number), and the MSC ID and the CELL ID of the femto node 210. The MFIF 254 may determine if AT 220 is registered with the femto node 210. In one embodiment, the MFIF 254 may search a database comprising a list of femto nodes and the ATs associated with each femto node. The MFIF 254 may forward this information in another message to the macro node 205 via the MSC 252. The macro node 205 may then instruct the AT 220 to hand in to the femto node 210 or to change frequencies according to the processes described below. In the following embodiments, different options for performing mobile inter-frequency handoffs are described in greater detail.

Figure 3:
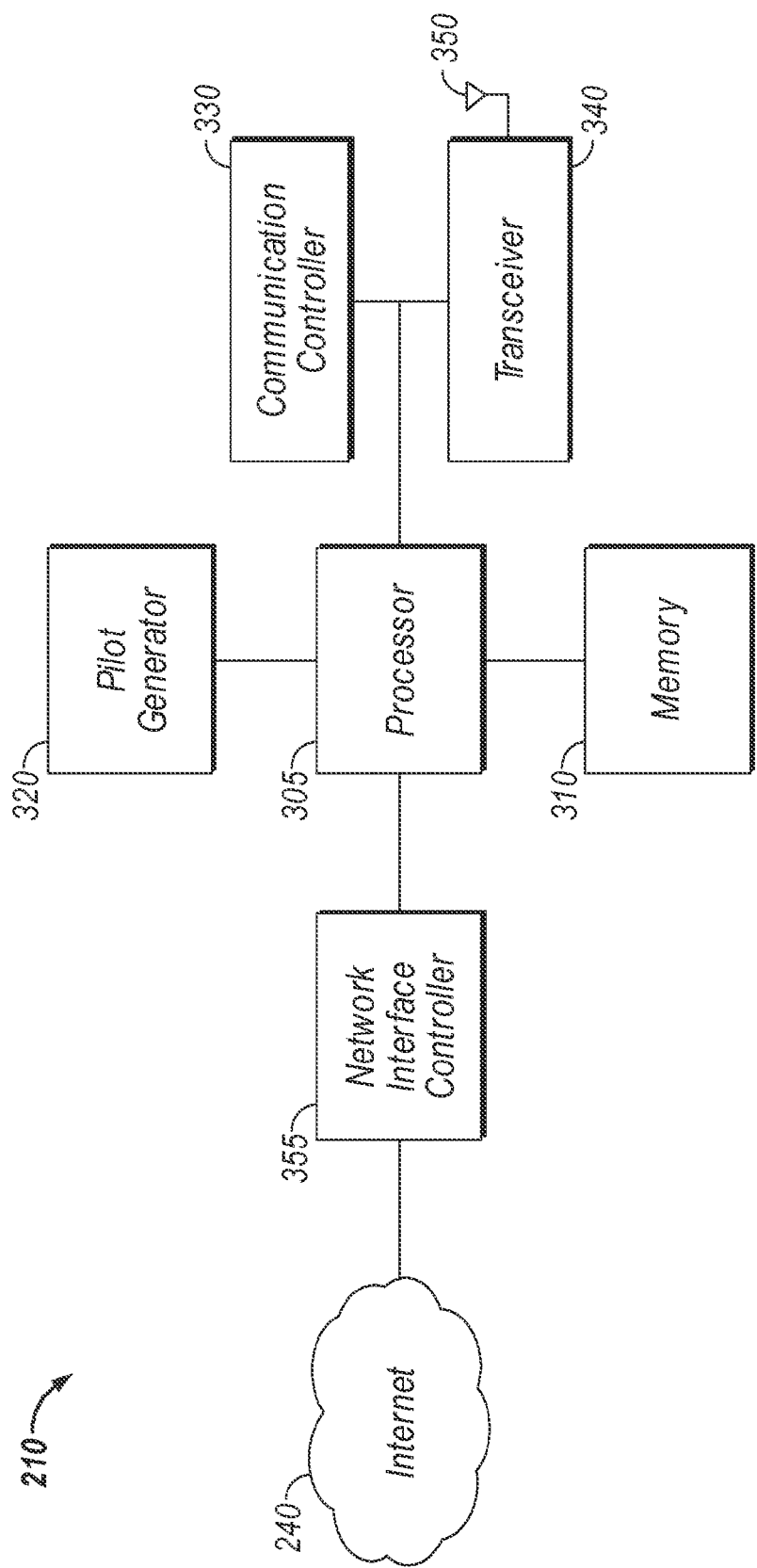
FIG. 3 is a functional block diagram of an exemplary femto node shown in FIG. 2.

FIG. 3 is a functional block diagram of an exemplary femto node 210 shown in FIG. 2. As discussed above with respect to FIG. 2, the femto node 210 may provide the AT 220 communication access to the communication network 250 via the Internet 240. The AT 220 may transmit information to an antenna 350 of the femto node 210. The antenna 350 may be configured to receive the information transmitted from the AT 220. The antenna 350 may further be coupled to a transceiver 340. The transceiver 340 may be configured to demodulate the information received from the AT 220. The transceiver 340 may further be coupled to a communication controller 330 configured to control the demodulation of information by the transceiver 340. Both the transceiver 340 and the communication controller 330 may further be coupled to a processor 305. The processor 305 may further process the demodulated information for storage, transmission, and/or for the control of other components of the femto node 210. The processor 305 may further be coupled, via one or more buses, to read information from or write information (e.g., the processed information) to a memory 310. The processor 305 may also be coupled to a network interface controller 355 configured to communicate with the Internet 240. Accordingly, processed information may be sent from the processor 305 to another node via the network interface controller 355 and the Internet 240.

The processor 305 may also be coupled to a pilot generator 320 configured to generate a pilot signal for transmission to the AT 220 as discussed above with reference to FIG. 2. As discussed above, the pilot signal may comprise a reference signal for the AT 220 to determine the strength of signals received from the femto node 210. The pilot generator 320 may generate a pilot signal and send the pilot signal to the processor 305. The processor 305 may then send the pilot signal to the communication controller 330 and the transceiver 340. The communication controller 330 and the transceiver 340 may prepare the pilot signal for wireless transmission via the antenna 350. The pilot signal may be transmitted with an identifier (e.g., the PN offset) of the femto node 210. In one embodiment, the pilot signal may be generated and/or transmitted periodically and received by an AT, such as, for example, the AT 220.

The antenna 350 may be configured to send and/or receive information to and/or from the AT 220 over one or more frequency channels. The information may comprise voice and/or data-only information (referred to herein as "information"). The antenna may comprise one or more physical and/or virtual antennas.

The communication controller 330 and the transceiver 340 may be configured to demodulate the information received via the antenna 350 according to one or more radio standards using methods known in the art. Further, the communication controller 330 and the transceiver 340 may modulate information to be sent from the femto node 210 via the antenna 350 according to one or more radio standards using methods known in the art. Information to be sent may be received from the processor 305.

The processor 305 may read and write portions of the information and/or packets (e.g., voice information, data information, pilot signals, etc.) destined for the AT 220 and/or other ATs to and from the memory 310.

The femto node 210 may connect to a communication network, such as, for example, the Internet 240 via the network interface controller 355. Accordingly, femto node 210 may communicate through the Internet 240 with other nodes coupled to the communication network 250 as discussed above with respect to FIG. 2.

Although described separately, it is to be appreciated that functional blocks described with respect to the femto node 210 need not be separate structural elements. For example, the processor 305 and the memory 310 may be embodied in a single chip. The processor 305 may additionally, or in the alternative, contain memory, such as processor registers. Similarly, two or more of the processor 305, the pilot generator 320, the communication controller 330, and the transceiver 340 may be embodied in a single chip. Further, the transceiver 340 may comprise a transmitter, receiver, or both. In other embodiments, the transmitter and receiver are two separate components.

The memory 310 may comprise processor cache, including a multi-level hierarchical cache in which different levels have different capacities and access speeds. The memory 310 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

One or more of the functional blocks and/or one or more combinations of the functional blocks described with respect to the femto node 210 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the femto node 210 may also be implemented as a combination of computing devices, e.g., a combination of a DSP and a microprocessor, a plurality of microprocessors, one or more microprocessors in conjunction with a DSP communication, or any other such configuration.

Figure 4:
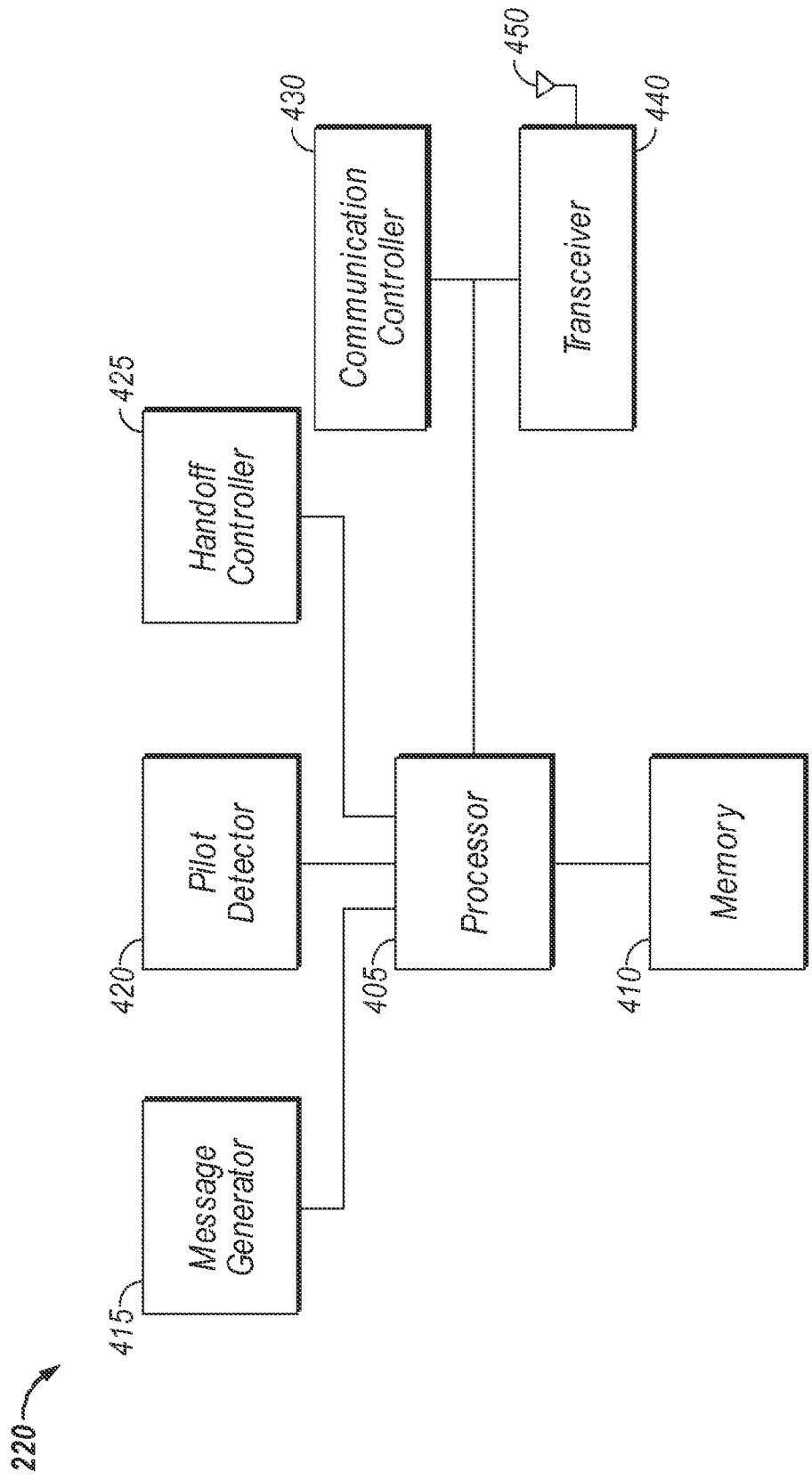
FIG. 4 is a functional block diagram of an exemplary access terminal shown in FIG. 2.

FIG. 4 is a functional block diagram of an exemplary access terminal 220 shown in FIG. 2. As discussed above with respect to FIG. 2, the AT 220 may be used to access the communication network 250. The AT 220 may access the communication network 250 via the femto node 210 and/or the macro node 205. The AT 220 may transmit and/or receive information to other ATs via the femto node 210 and/or the macro node 205 and the communication network 250.

The AT 220 may comprise a processor 405 configured to process information for storage, transmission, and/or for the control of other components of the AT 220. The processor 405 may further be coupled, via one or more buses, to read information from or write information (e.g., the processed information) to a memory 410. For example, the AT 220 may process information to be transmitted via the communication network 250. The processor 405 may also be coupled to a transceiver 440 configured to modulate the information to be transmitted. The transceiver 440 may further be coupled to a communication controller 430 configured to control the modulation of information by the transceiver 440. The transceiver may be further coupled to an antenna 450 configured to transmit the information from the AT 220 to the femto node 210 and/or the macro node 205. Accordingly, information may be generated and sent from the AT 220 to the femto node 210 and/or the macro node 205. Similarly, AT 220 may also receive information from the femto node 210 and/or the macro node 205

The processor 405 may also be coupled to a pilot detector 420. The pilot detector 420 may be configured to determine whether data transmitted from a node (e.g., femto node 210 or macro node 205) comprises a pilot signal transmitted from a femto node and/or a macro node 205 as discussed above with respect to FIG. 2. As discussed above, the pilot signal may comprise a reference signal for determining the strength of signals received from the transmitting node. For example, a pilot signal may be received at the AT 220 via the antenna 450. The pilot signal may be demodulated by the transceiver 440. The communication controller 430 may control the demodulation of the pilot signal by the transceiver 440. The pilot signal may then be sent to the processor 405, which may process the pilot signal 405. The processor 405 forwards the pilot signal to the pilot detector 420. In some embodiments, the pilot detector 420 may determine the received data is in fact a pilot signal. The pilot detector 420 may also determine whether the pilot signal is from a femto node or some other source by determining the PN offset of the pilot signal as discussed with respect to FIG. 2.

The processor 405 may further be coupled to a message generator 415. The message generator 415 may be configured to generate a PSMM as discussed above with regards to FIG. 2. As discussed above, the PSMM may comprise a PN offset to identify the type of node that transmitted the pilot signal and/or the strength of the received pilot signal. For example, the processor 405 may send the pilot signal to the message generator 415 when it is determined at the pilot detector 420 that the pilot signal is from a node. The message generator 415 may then generate a PSMM. The PSMM may be used to indicate to the macro node 205 that the AT 220 has received a pilot signal from a femto node, such as, for example the femto node 210. The PSMM may also indicate the strength of the pilot signal received from the femto node 210. The PSMM may also indicate the strength of a pilot signal received from the macro node 205. The PSMM may then be sent to the processor 405 and then forwarded to the transceiver 440. The PSMM may then be modulated by the communication controller 430 and the transceiver 440 for wireless transmission via the antenna 450 to the macro node 205 as discussed above. In one embodiment, the AT 220 may then send the PSMM to the macro node 205 and an inter-frequency handoff may be initiated as discussed above with respect to FIG. 2.

The processor 405 may also be coupled to a handoff controller 425. The handoff controller 425 may be configured to perform an inter-frequency handoff in response to a request to perform an inter-frequency handoff received from the macro node 205 as discussed above with respect to FIG. 2. For example, the AT 220 may be communicating with the macro node 205 over a first frequency f1. The AT 220 may receive a request to perform an inter-frequency handoff from the macro node 205 via the antenna 450. The request may be sent by macro node 205 in response to the PSMM sent by the AT 220. The request may comprise a message that indicates that the access terminal 220 should perform an inter-frequency handoff from the first frequency f1 to a second frequency f2. The communication controller 430 and the transceiver 440 may demodulate the request to perform an inter-frequency handoff and send the request to the processor 405. The processor 405 may then process and forward the request to the handoff controller 425. The handoff controller 425, in response to the request, may then cause the access terminal 220 to communicate with the macro node 205 on the second frequency f2. Accordingly, the AT 220 may perform an inter-frequency handoff.

The antenna 450 may be configured to send and/or receive information to and/or from the macro node 205 and/or the femto node 210 over one or more frequency channels. The information may comprise voice and/or data-only information (referred to herein as "information"). The antenna may comprise one or more physical and/or virtual antennas.

The communication controller 430 and the transceiver 440 may be configured to demodulate the information received via the antenna 450 according to one or more radio standards using methods known in the art. Further, the communication controller 430 and the transceiver 440 may modulate information to be sent from the AT 220 via the antenna 450 according to one or more radio standards using methods known in the art. Information to be sent may be received from the processor 405.

The processor 405 may read and write portions of the information and/or packets (e.g., voice information, data information, PSMMs, etc.) destined for the femto node 210, macro node 205, and/or other ATs to and from the memory 410.

Although described separately, it is to be appreciated that functional blocks described with respect to the access terminal 220 need not be separate structural elements. For example, the processor 405 and the memory 410 may be embodied in a single chip. The processor 405 may additionally, or in the alternative, contain memory, such as processor registers. Similarly, two or more of the processor 405, the message generator 415, the pilot detector 420, the handoff controller 425, the communication controller 430, and the transceiver 440 may be embodied in a single chip. Further, the transceiver 440 may comprise a transmitter, receiver, or both. In other embodiments, the transmitter and receiver are two separate components.

The memory 410 may comprise processor cache, including a multi-level hierarchical cache in which different levels have different capacities and access speeds. The memory 410 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

One or more of the functional blocks and/or one or more combinations of the functional blocks described with respect to the access terminal 220 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the access terminal 220 may also be implemented as a combination of computing devices, e.g., a combination of a DSP and a microprocessor, a plurality of microprocessors, one or more microprocessors in conjunction with a DSP communication, or any other such configuration.

Figure 5:
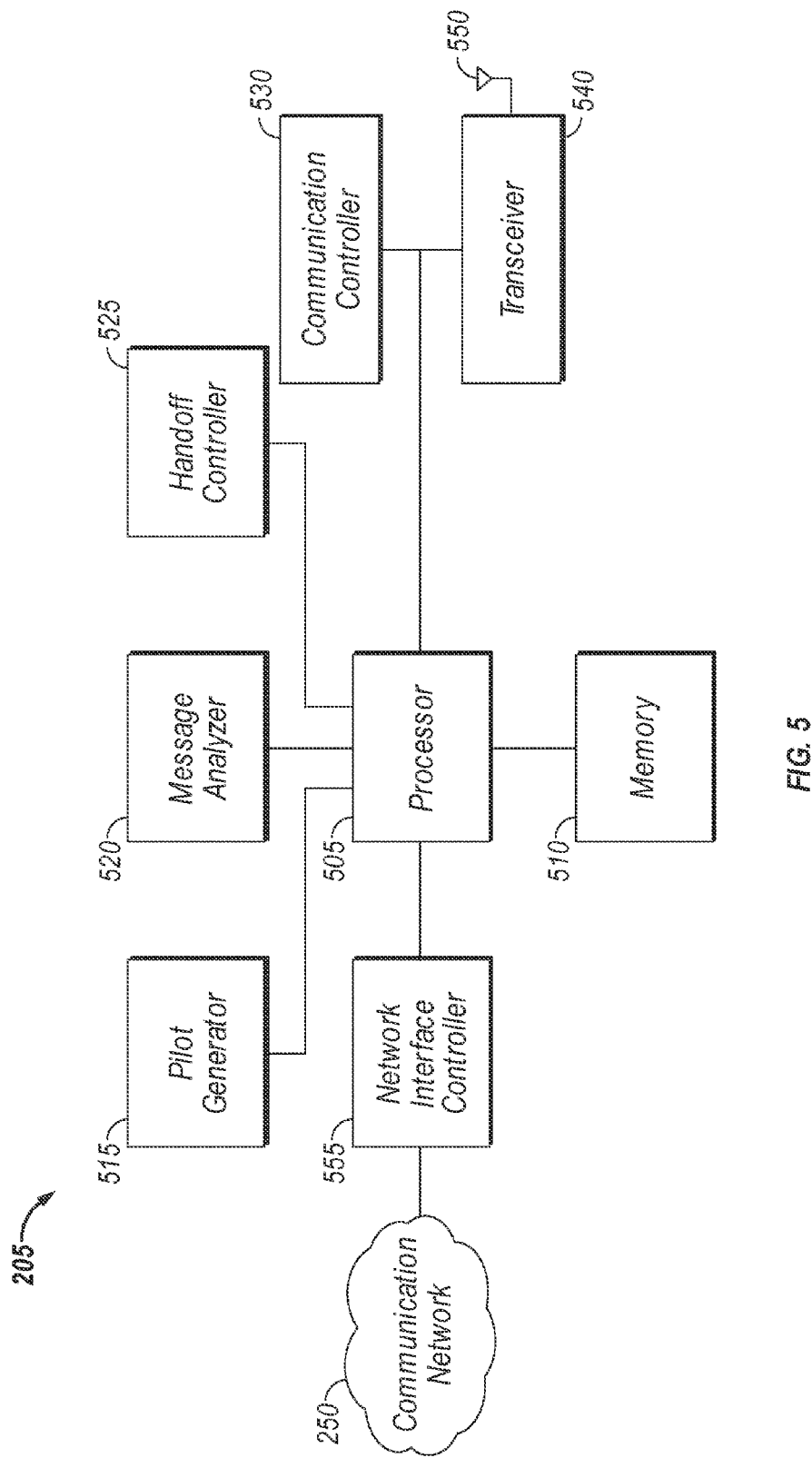
FIG. 5 is a functional block diagram of an exemplary macro node shown in FIG. 2.

FIG. 5 is a functional block diagram of an exemplary macro node 205 shown in FIG. 2. As discussed above with respect to FIG. 2, the macro node 205 may provide the AT 220 communication access to the communication network 250. The AT 220 may transmit information to an antenna 550 of the macro node 205. The antenna 550 may be configured to receive the information transmitted from the AT 220. The antenna 550 may further be coupled to a transceiver 540. The transceiver 540 may be configured to demodulate the information received from the AT 220. The transceiver 540 may further be coupled to a communication controller 530 configured to control the demodulation of information by the transceiver 540. Both the transceiver 540 and the communication controller 530 may further be coupled to a processor 505. The processor 505 may further process the demodulated information for storage, transmission, and/or for the control of other components of the macro node 205. The processor 505 may further be coupled, via one or more buses, to read information from or write information (e.g., the processed information) to a memory 510. The processor 505 may also be coupled to a network interface controller 555 configured to communicate with the communication network 250. Accordingly, processed information may be sent from processor 505 to another node via the network interface controller 555.

The processor 505 may be coupled to a pilot generator 515 configured to generate a pilot signal for transmission to the AT 220 as discussed above with reference to FIG. 2. As discussed above, the pilot signal may comprise a reference signal for the AT 220 to determine the strength of signals received from the macro node 205. The pilot generator 515 may generate a pilot signal and send the pilot signal to the processor 505. The processor 505 may then send the pilot signal to the communication controller 530 and the transceiver 540. The communication controller 530 and the transceiver 540 may prepare the pilot signal for wireless transmission via the antenna 550. In one embodiment, the pilot signal may be generated and/or transmitted periodically and received by an AT, such as, for example, the AT 220.

The processor 505 may be further coupled to a message analyzer 520. The message analyzer 520 may be configured to analyze a PSMM received from the AT 220 discussed above with respect to FIGS. 2 and 4. For example, a PSMM sent from the AT 220 may be received via the antenna 550 and demodulated by the communication controller 530 and the transceiver 540. The PSMM may then be sent to the processor 505 to be processed and forwarded to the message analyzer 520. The message analyzer 520 may determine whether the received PSMM indicates that the access terminal 220 has detected a femto node, such as, for example, the femto node 210. The message analyzer 520 may also determine the received strength of the pilot signal of the femto node 210 as indicated by the PSMM. In addition, the PSMM may indicate the strength of a pilot signal transmitted from the macro node 205 and received by the AT 220. Accordingly, the message analyzer 520 may determine the received strength of the pilot signal of the macro node 205 as indicated by the PSMM. The message analyzer may then send a signal to the handoff controller 525 to perform an inter-frequency handoff according to the processes described below.

The processor 505 may also be coupled to a handoff controller 525. The handoff controller 525 may be configured to perform an inter-frequency handoff in response to the PSMM received from the AT 220. For example, the macro node 205 may be communicating with the AT 220 using a first frequency f1. The macro node 205 may then receive the PSMM from the AT 220 and analyze the PSMM at the message analyzer 520. The message analyzer 520 may send a signal via the processor 505 to the handoff controller 525 that indicates that the macro node 205 should perform an inter-frequency handoff with the AT 220. The signal may be generated according to methods described below with respect to FIGS. 7 and 8 based on the PSMM analyzed by the message analyzer 520. The handoff controller 525 may be configured to choose a second frequency f2 to communicate with the AT 220. The handoff controller 525 may then send a message comprising a request to perform an inter-frequency handoff to be transmitted to the access terminal 220. The message may be sent via processor 505 to communication controller 530 and transceiver 540 to be modulated for transmission. The message may be transmitted to AT 220 via antenna 550. The message may indicate to the AT 220 to communicate on the second frequency f2 with the macro node 205. Accordingly, the macro node 205 may perform an inter-frequency handoff.

The antenna 550 may be configured to send and/or receive information to and/or from the AT 220 over one or more frequency channels. The information may comprise voice and/or data-only information (referred to herein as "information"). The antenna may comprise one or more physical and/or virtual antennas.

The communication controller 530 and the transceiver 540 may be configured to demodulate the information received via the antenna 550 according to one or more radio standards using methods known in the art. Further, the communication controller 530 and the transceiver 540 may modulate information to be sent from the macro node 205 via the antenna 550 according to one or more radio standards using methods known in the art. Information to be sent may be received from the processor 505.

The processor 505 may read and write portions of the information and/or packets (e.g., voice information, data information, inter-frequency handoff messages, etc.) destined for the AT 220 and/or other ATs to and from the memory 510.

The macro node 205 may connect to a communication network 250 via the network interface controller 555. Accordingly, macro node 205 may communicate with other nodes coupled to the communication network 250 as discussed above with respect to FIG. 2.

Although described separately, it is to be appreciated that functional blocks described with respect to the macro node 500 need not be separate structural elements. For example, the processor 505 and memory 510 may be embodied in a single chip. Similarly, two or more of the processor 505, the pilot generator 515, message analyzer 520, handoff controller 525, communication controller 530, and transceiver 540 may be embodied in a single chip. Further, the transceiver 540 may comprise a transmitter, receiver, or both. In other embodiments, the transmitter and receiver are two separate components.

The memory 510 may comprise processor cache, including a multi-level hierarchical cache in which different levels have different capacities and access speeds. The memory 510 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

One or more of the functional blocks and/or one or more combinations of the functional blocks described with respect to the macro node 205 may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the macro node 205 may also be implemented as a combination of computing devices, e.g., a combination of a DSP and a microprocessor, a plurality of microprocessors, one or more microprocessors in conjunction with a DSP communication, or any other such configuration.

Figure 6:
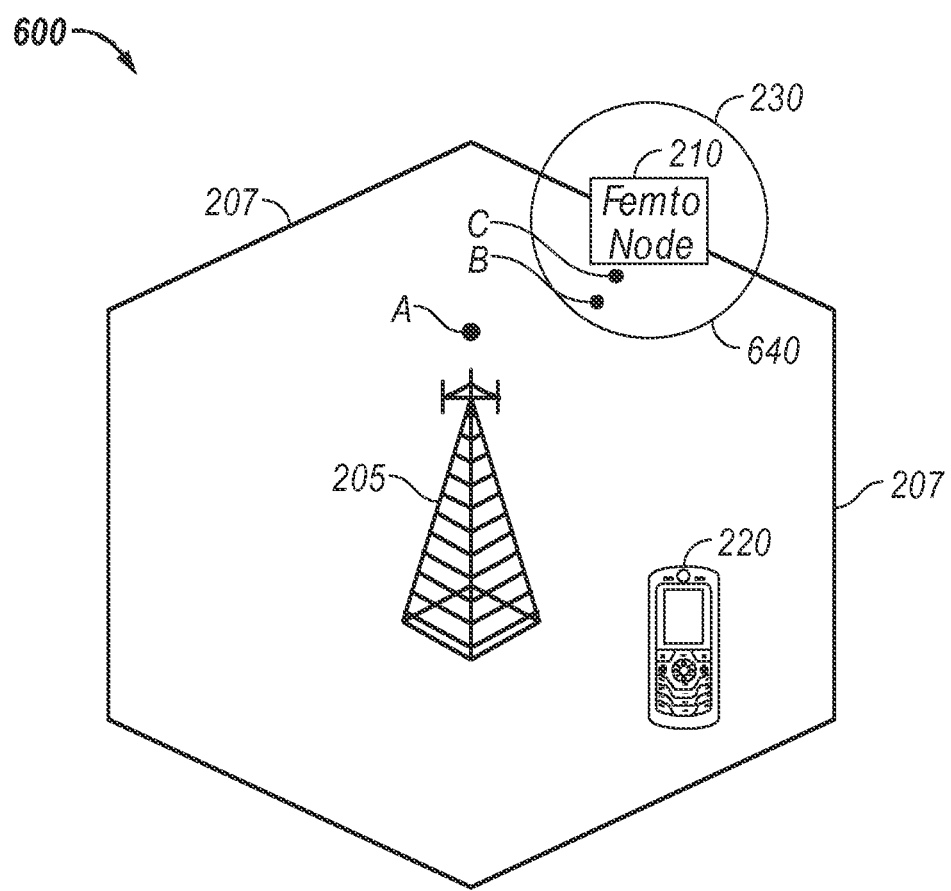
FIG. 6 illustrates an exemplary wireless communication system comprising the macro node and the femto node of FIG. 2.

FIG. 6 illustrates an exemplary wireless communication system comprising the macro node 205 and the femto node 210 of FIG. 2. The wireless communication system 600 comprises the macro area 207, which is serviced by the macro node 205 as discussed above with respect to FIG. 2. The wireless communication system 600 further comprises the femto area 230, which is serviced by the femto node 210. In this embodiment, the macro area 207 and the femto area 230 may partially overlap forming an area of overlap 640. As discussed above with respect to FIG. 2, an AT, such as, for example, the AT 220 may access the communication network 250 via the femto node 210 within the femto area 230. Further an AT, such as, for example, the AT 220 may access the communication network 250 via the macro node 205 within the macro area 207. Accordingly, the AT 220 within the communication system 600 may communicate with other ATs through the communication network 250.

The AT 220 may communicate with the macro node 205 within the macro area 207 via a communication link as discussed with respect to FIG. 2. In one embodiment, the communication link is established over a first frequency channel f1. Accordingly, the AT 220 and the macro node 205 exchange information over the frequency channel f1 within the macro area 207. Further, the femto node 210 may transmit signals on the same frequency channel f1 within the femto area 230. For example, the femto node 210 may communicate with other ATs within the femto area 230 over the same frequency channel f1.

Interference may occur between communications of the femto node 210 and the macro node 205 within the area of overlap 640. The interference may occur due to the macro node 205 and the femto node 210 transmitting signals on the same frequency channel. Within the area of overlap 640, the AT 220 may hear or receive transmissions on the first frequency channel f1 from both the macro node 205 and the femto node 210. Accordingly, the AT 220 may not be able to interpret and/or separate the signals received from the femto node 210 and/or the macro node 205. The interference levels at various points within the system 600 are discussed below.

The AT 220 may be positioned at a point A and may communicate with the macro node 205. Point A is within the macro area 207, but outside of the femto area 230. Therefore, when the AT 220 communicates with the macro node 205 at point A, the femto node 210 does not interfere with the communication.

The AT 220 may also be positioned at a point within the area of overlap 640 and may communicate with the macro node 205. For example, the AT 220 at point B may experience interference when communicating with the macro node 205. The interference may be caused by the femto node 210 transmitting on the same frequency channel as the macro node 205. The level of interference caused by the femto node 210 in the area of overlap 640 may be inversely proportional to the distance between the AT 220 and the femto node 210. Therefore, when the AT 220 communicates with the macro node 205 at point C, the AT 220 may experience greater levels of interference from signals transmitted by the femto node 210 than when at point B.

At some point, the level of interference caused by the femto node 210 may prevent the AT 220 from being able to interpret and/or separate communication signals received from the macro node 205. For example, the signal-to-noise ratio at the AT 220 of signals received from the macro node 205 may be less than a certain threshold ratio. The threshold ratio may be the minimum signal-to-noise ratio needed for the AT 220 to communicate with the macro node 205. The noise may comprise interfering RF signals including transmissions from the femto node 210 over the same frequency channel as used by the macro node 205 to communicate with the AT 220.

In some cases, interference caused by the femto node 210 may not prevent all communication between the macro node 205 and the AT 220. However, the interference may require information to be communicated at a lower rate between the macro node 205 and the AT 220. For example, the macro node 205 may need to send redundant data or additional error correcting bits with the data in order to ensure that the AT 220 is able to interpret the received signal. The communication link between the macro node 205 and the AT 220 may have a limited bandwidth, and therefore, sending additional error correcting data may require use of channel bandwidth that otherwise could be used to communicate messages.

In certain embodiments, the macro node 205 may monitor the interference caused by the femto node 210 via communications between the macro node 205 and the AT 220 as discussed above with reference to FIG. 2. In some such embodiments, the macro node 205 may direct the AT 220 to perform an inter-frequency handoff. The AT 220 may then perform the inter-frequency handoff and begin communicating with the macro node 205 on a different frequency than the frequency used for communications by the femto node 210. Accordingly, the signals from the femto node 210 will not interfere with the signals received at the AT 220 from the macro node 205.

Figure 7:
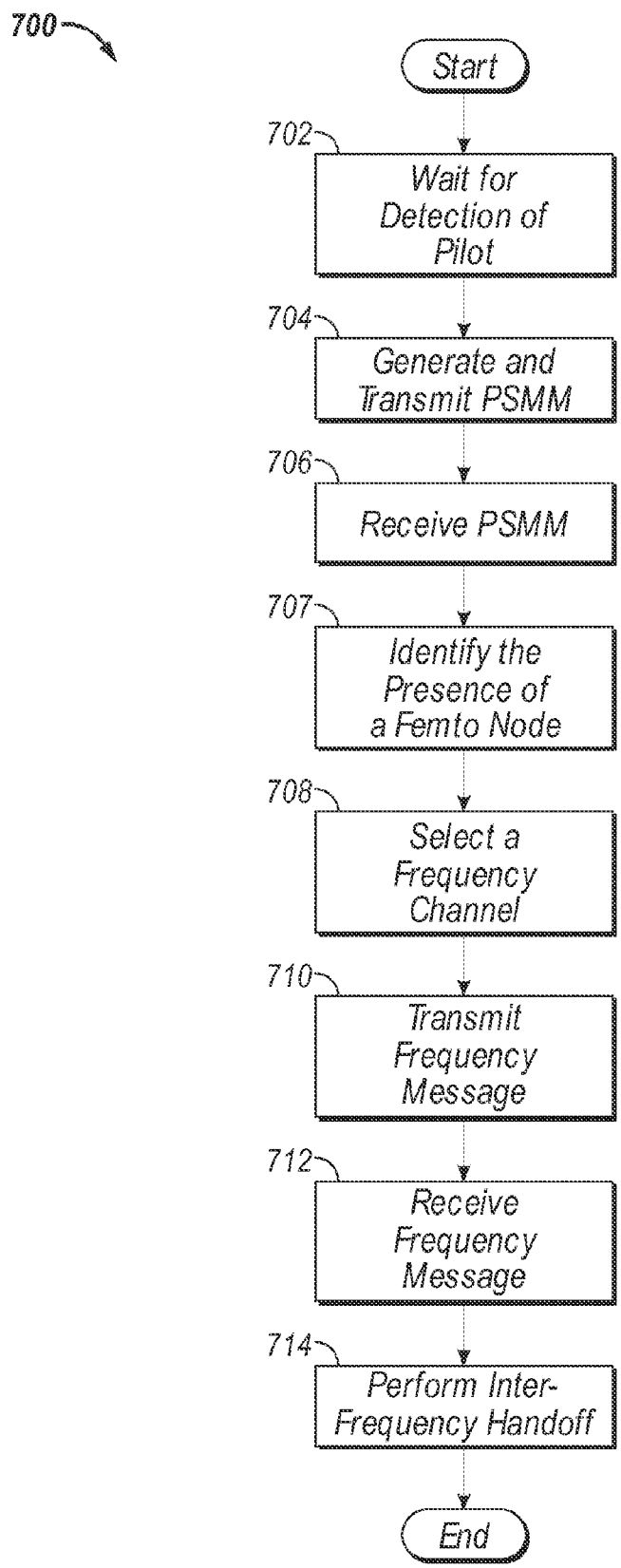
FIG. 7 is a flowchart of a first exemplary process of monitoring interference caused by the femto node of FIG. 2.

FIG. 7 is a flowchart of a first exemplary process of monitoring interference caused by the femto node 210 of FIG. 2. The process 700 may be used to perform an inter-frequency handoff at the macro node 205 and the AT 220 in response to interference from the femto node 210 as discussed above with respect to FIG. 6.

At a first step 702, the AT 220 may wait to detect a pilot signal sent from the femto node 210. After detecting a pilot signal sent from the femto node 210, the process 700 continues to a step 704. At the step 704, the AT 220 may generate a PSMM and transmit the PSMM to the macro node 205. In some embodiments, the PSMM message indicates that the AT 220 has detected a femto node. Further, at a step 706, the macro node 205 may receive the PSMM message transmitted by the AT 220. Continuing at a step 707, the macro node 205 may identify the presence of the femto node 210 from the received PSMM message. At a next step 708, the macro node 205 may select a frequency channel for the AT 220 and the macro node 205 to communicate over after performing an inter-frequency handoff as discussed above. In one embodiment, the selected frequency channel is an available frequency channel that is not adjacent to the frequency channel used for communication between the AT 220 and the macro node 205 before the inter-frequency handoff. For example, each frequency channel may have a bandwidth (e.g., 1.25 MHz) centered at a particular frequency. Therefore, the centers of nonadjacent frequency channels are separated by at least this bandwidth.

Next, at a step 710, the macro node 205 may transmit a message to the AT 220 directing the AT 220 to perform an inter-frequency handoff. In some embodiments, the message comprises the frequency channel selected at step 708 over which the AT 220 communicates with the macro node 205 after the handoff. Continuing at a step 712, the AT 220 receives the message from the macro node 210. Further, at step 714, the AT 220 begins communicating on a new frequency channel, which in one embodiment is the frequency channel indicated by the message received at the AT 220 in step 712.

Figure 8:
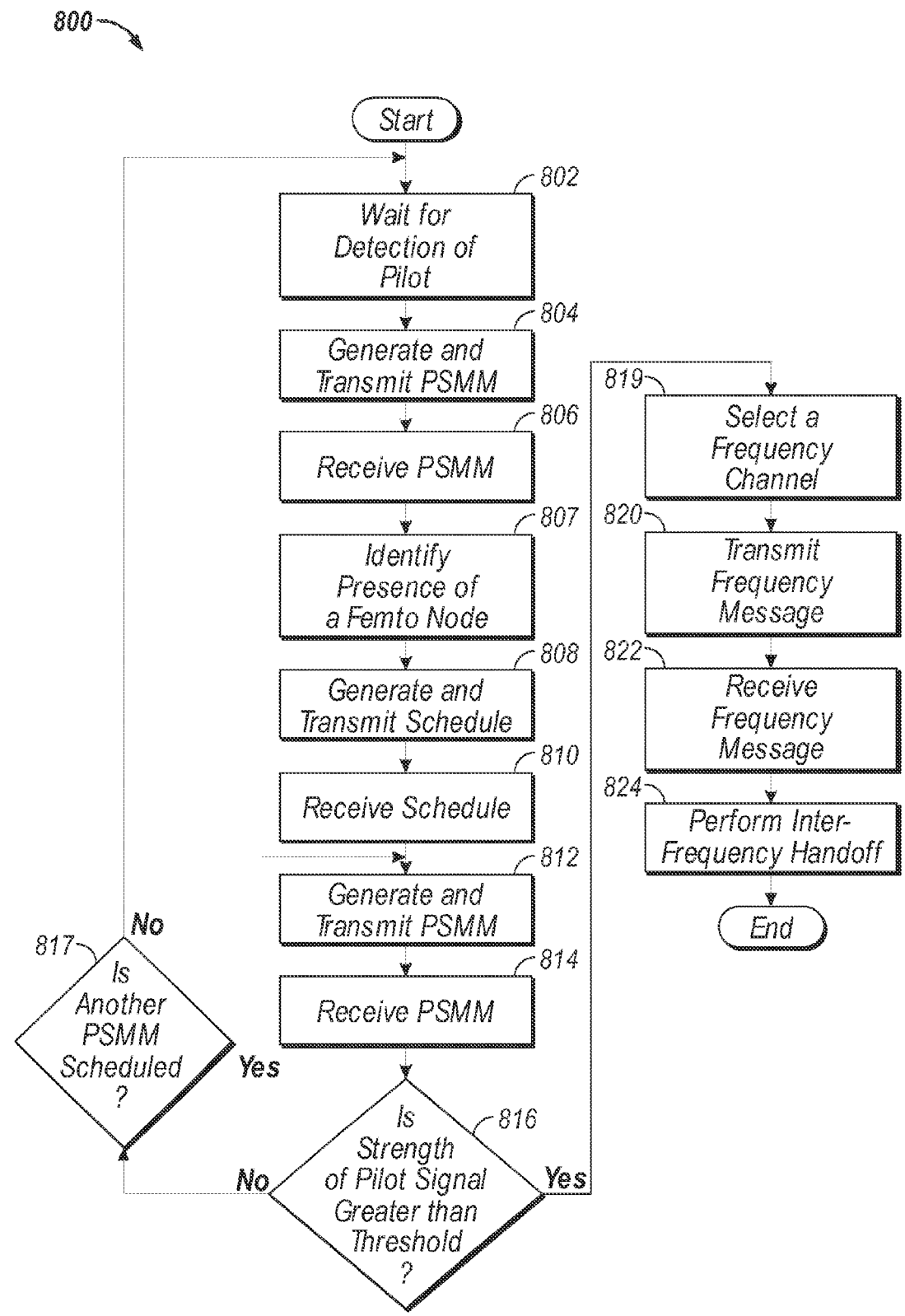
FIG. 8 is a flowchart of a second exemplary process of monitoring interference caused by the femto node of FIG. 2.

FIG. 8 is a flowchart of a second exemplary process of monitoring interference caused by the femto node 210 of FIG. 2. The process 800 may be used to perform an inter-frequency handoff at the macro node 205 and the AT 220 in response to interference from the femto node 210 as discussed above with respect to FIG. 6.

At a first step 802, the AT 220 may wait to detect a pilot signal sent from the femto node 210. After detecting a pilot signal sent from the femto node 210, the process 800 continues to a step 704. At the step 804, the AT 220 may generate a PSMM and transmit the PSMM to the macro node 205. In some embodiments, the PSMM message indicates that the AT 220 has detected a femto node. Further, at a step 806, the macro node 205 may receive the PSMM message transmitted by the AT 220. Continuing at a step 807, the macro node 205 may identify the presence of the femto node 210 from the received PSMM message. At a next optional step 808, the macro node 205 may generate a message requesting the AT 220 to transmit additional PSMMs to the macro node 205. The message may indicate a schedule comprising the number of PSMMs to send to the macro node 205 and the time intervals at which to send the PSMMs. In some embodiments, the message may indicate to the AT 220 to periodically generate and transmit a PSMM. At a next optional step 810, the AT 220 may receive the message from the macro node 205. It should be noted that steps 808 and 810 are optional in some embodiments. In such embodiments, the AT 220 may have a preconfigured schedule to send PSMMs to the macro node 205. For example, in one embodiment AT 220 autonomously sends periodic PSMMS to the macro node 205.

Further, at a step 812, the AT 220 may generate and transmit a PSMM according to the schedule. The generated PSMM may indicate the strength of the latest pilot signal received by the AT 220 from the femto node 210. The strength of the pilot signal received at the AT 220 from the femto node 210 is indicative of the strength of transmissions from the femto node 210 that may interfere with communication signals received at the AT 220. The generated PSMM may also indicate the strength of the latest pilot signal received by the AT 220 from the macro node 205. The strength of the pilot signal received at the AT 220 from the macro node 205 is indicative of the strength of transmissions from the macro node 205. Accordingly, the PSMM message acts as an update mechanism that indicates the current level of interference caused by the femto node 210 on communication between the macro node 205 and the AT 220. The PSMM message may also act as an update mechanism as to the quality of signal received by the AT 220 from macro node 205.

At a further step 814, the macro node 205 may receive the PSMM message. Continuing at step 816, the macro node 205 may determine if the strength of the pilot signal received at the AT 220 from the femto node 210 in the PSMM message is above a first predetermined threshold value. In addition or in the alternative, the macro node 205 may determine if the strength of the pilot signal received at the AT 220 from the macro node 205 in the PSMM message is below a second predetermined threshold value. If the strength of the pilot signal received at the AT 220 from the femto node 210 is not above the first predetermined threshold, process 800 may proceed to a step 817. In addition or in the alternative, if the strength of the pilot signal received at the AT 220 from the macro node 205 is not below the second predetermined threshold, process 800 may proceed to a step 817.

At step 817, the AT 220 may determine if another PSMM message is scheduled to be generated and transmitted according to the schedule. If at step 817 it is determined another PSMM message is not scheduled to be generated, the process 800 returns to step 802 and waits to detect another pilot signal from the femto node 210. If at step 817 it is determined another PSMM message is scheduled to be generated, the process may return to step 812 where the AT 220 generates and transmits another PSMM.

If at step 816 it is determined the strength of the pilot signal received at the AT 220 from the femto node 210 is above the first threshold and/or the pilot signal received at the AT 220 from the macro node 205 is below the second threshold, the process 800 continues to step 819. At step 819, the macro node 205 may select a frequency channel for the AT 220 and the macro node 205 to communicate over after performing an inter-frequency handoff as discussed above with respect to FIG. 6. In one embodiment, the selected frequency channel is an available frequency channel that is not adjacent to the frequency channel used for communication between the AT 220 and the macro node 205 before the inter-frequency handoff. Next, at a step 820, the macro node 205 may transmit a message to the AT 220 directing the AT 220 to perform an inter-frequency handoff. In some embodiments, the message comprises the frequency channel over which the AT 220 communicates with the macro node 205 after the handoff. Continuing at a step 822, the AT 220 receives the message from the macro node 205. Further, at step 824, the AT 220 begins communicating on a new frequency channel, which in one embodiment is the frequency channel indicated by the message received at the AT 220.

It should be noted that processes similar to processes 700 and 800 may also be used to monitor interference caused by a femto node with communication between a macro node and an AT. In some embodiments, processes similar to processes 700 and 800 may comprise fewer, additional, or alternate steps. For example, in one embodiment steps 808 and 810 of process 800 may be removed. A new step may take the place of steps 808 and 810. At the new step, the AT 220 may generate a schedule comprising the number of PSMMs to send to the macro node 205 and the time intervals at which to send the PSMMs. In some embodiments, the schedule may indicate for the AT 220 to periodically generate and transmit a PSMM. Further, in some embodiments of processes 700 and 800, the decision to perform an inter-frequency handoff may be made at the AT 220 by the processor 405. In some such embodiments, the AT 220 may generate the message to send to the macro node 205 to perform the inter-frequency handoff.

Figure 9:
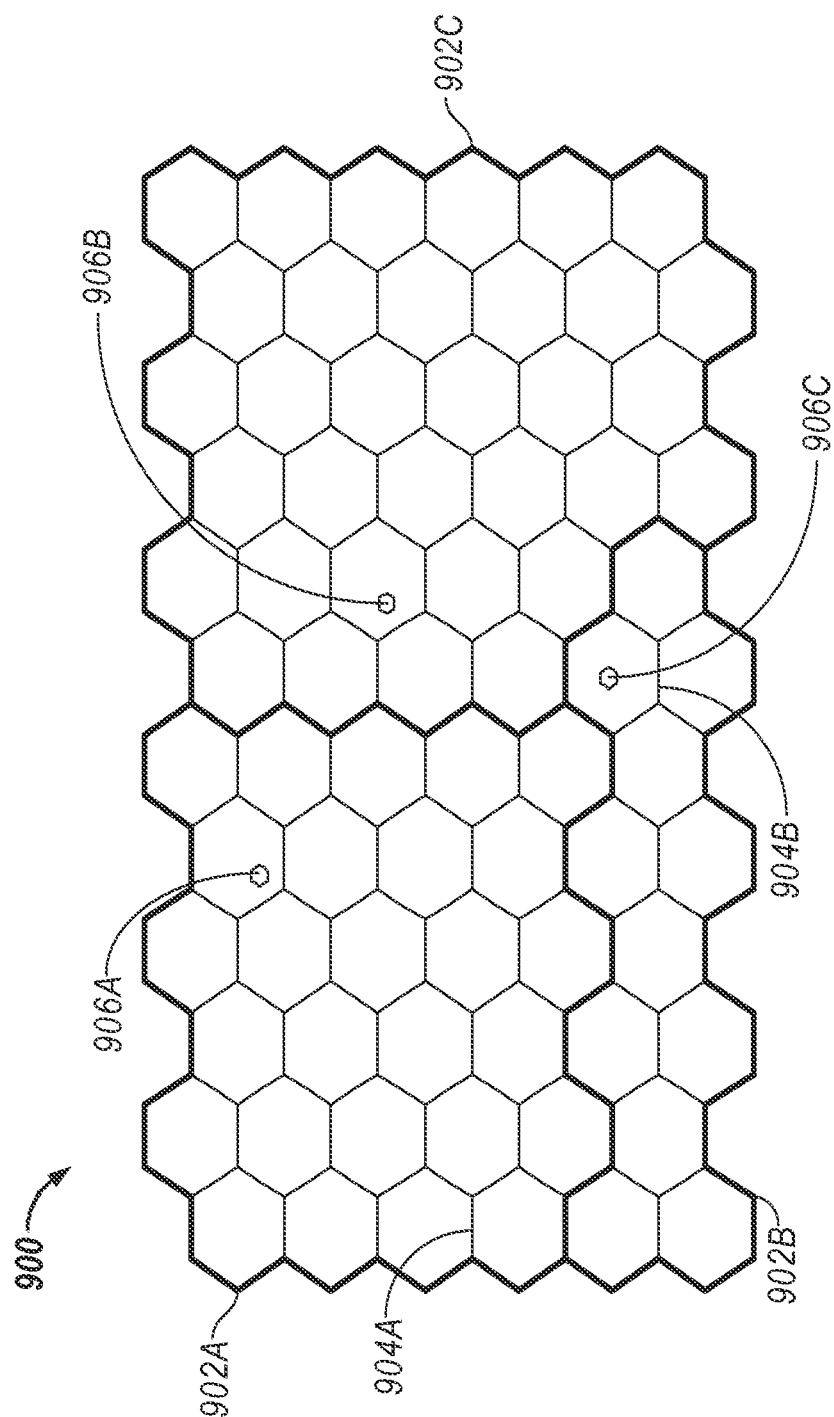
FIG. 9 illustrates exemplary coverage areas for wireless communication networks as shown, e.g., in FIGS. 1 and 2.

FIG. 9 illustrates exemplary coverage areas for wireless communication networks as shown, e.g., in FIGS. 1 and 2. The coverage area 900 may comprise one or more geographical areas in which the AT 220 may access the communication network 250 as discussed above with respect to FIG. 2. As shown the coverage area 900 comprises several tracking areas 902 (or routing areas or location areas). Each tracking area 902 comprises several macro areas 904, which may be similar to the macro area 207 described above with respect to FIG. 2. Here, areas of coverage associated with tracking areas 902A, 902B, and 902C are shown as delineated by wide lines as and the macro areas 904 are represented by hexagons. The tracking areas 902 may also comprise femto areas 906, which may be similar to the femto area 230 described above with respect to FIG. 2. In this example, each of the femto areas 906 (e.g., femto area 906C) is depicted within a macro area 904 (e.g., macro area 904B). It should be appreciated, however, that a femto area 906 may not lie entirely within a macro area 904. In practice, a large number of femto areas 906 may be defined with a given tracking area 902 or macro area 904. Also, one or more pico areas (not shown) may be defined within a given tracking area 902 or macro area 904.

Referring again to FIG. 2, the owner of a femto node 210 may subscribe to a mobile service, such as, for example, 3G mobile service, offered through the communication network 250 (e.g., a mobile operator core network). In addition, an access terminal 221 may be capable of operating both in macro environments (e.g., macro areas) and in smaller scale (e.g., residential, femto areas, pico areas, etc.) network environments. In other words, depending on the current location of the access terminal 221, the access terminal 221 may access the communication network 250 by a macro node 205 or by any one of a set of femto nodes (e.g., femto node 210). For example, when a subscriber is outside his home, he may be served by a macro node (e.g., node 205) and when the subscriber is at home, he may be served by a femto node (e.g., node 210). It should further be appreciated that a femto node 210 may be backward compatible with existing access terminals 221.

A femto node 210 may communicate over a single frequency or, in the alternative, over multiple frequencies. Depending on the particular configuration, the single frequency or one or more of the multiple frequencies may overlap with one or more frequencies used by a macro node (e.g., node 250).

In one embodiment, an access terminal 221 may be configured to connect to a particular (e.g., preferred) femto node (e.g., a home femto node of the access terminal 221) whenever the access terminal 221 is within communication range of the femto node. For example, the access terminal 221 may communicate with only the femto node 210 when the access terminal 221 is within the femto area 230.

In another embodiment, the access terminal 221 is communicating with a node of the communication network 250 but is not communicating with a preferred node (e.g., as defined in a preferred roaming list). In this embodiment, the access terminal 221 may continue to search for a preferred node (e.g., the preferred femto node 210) using a Better System Reselection ("BSR"). The BSR may comprise a method comprising a periodic scanning of available systems to determine whether better systems are currently available. The BSR may further comprise attempting to associate with available preferred systems. The access terminal 221 may limit the BSR to scanning over one or more specific bands and/or channels. Upon discovery of a preferred femto node 210, the access terminal 221 selects the femto node 210 for communicating with to access the communication network 250 within the femto area 230.

In one embodiment, a node may only provide certain services to certain access terminals. Such a node may be referred to as a "restricted" or "closed" node. In wireless communication networks comprising restricted femto nodes, a given access terminal may only be served by macro nodes and a defined set of femto nodes (e.g., the femto node 210). In other embodiments, a node may be restricted to not provide at least one of: signaling, data access, registration, paging, or service.

In one embodiment, a restricted femto node (which may also be referred to as a Closed Subscriber Group Home NodeB) is one that provides service to a restricted provisioned set of access terminals. This set may be temporarily or permanently changed to include additional or fewer access terminals as necessary. In some aspects, a Closed Subscriber Group ("CSG") may be defined as the set of access nodes (e.g., femto nodes) that share a common access control list of access terminals (e.g., a list of the restricted provisioned set of access terminals). A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, such as 911 calls.

For convenience, the disclosure herein describes various functionalities related to a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each access terminal may communicate with one or more nodes via transmissions on the forward and reverse links. The forward link (or downlink) refers to the communication link from the node to the access terminal, and the reverse link (or uplink) refers to the communication link from the access terminal to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may be comprise NS independent channels, which are also referred to as spatial channels, where NS≤min{NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, an access terminal, etc.) to extract a transmit beam-forming gain on the forward link when multiple antennas are available at the device.

The teachings herein may be incorporated into a device (e.g., a node, an access terminal, etc.) employing various components for communicating with at least one other device.

Figure 10:
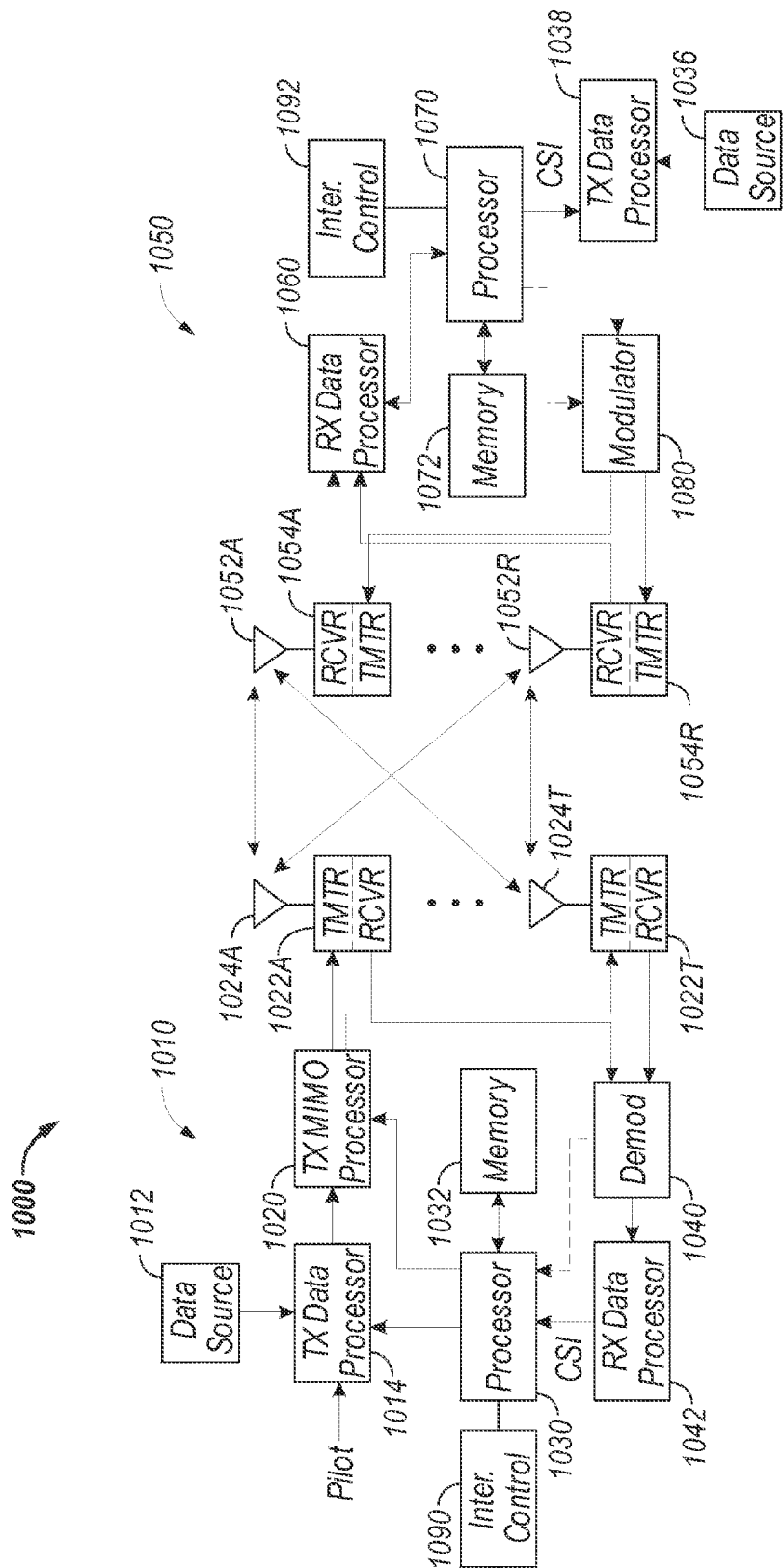
FIG. 10 is a functional block diagram of another exemplary node and another exemplary access terminal shown in FIG. 2.

FIG. 10 is a functional block diagram of another exemplary node and another exemplary access terminal shown in FIG. 2. As shown a MIMO system 1000 comprises a wireless device 1010 (e.g., the femto node 210, the macro node 205, etc.) and a wireless device 1050 (e.g., the AT 220). At the device 1010, traffic data for a number of data streams is provided from a data source 1012 to a transmit ("TX") data processor 1014.

In one embodiment, each data stream is transmitted over a respective transmit antenna. The TX data processor 1014 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides NT modulation symbol streams to NT transceivers ("XCVR") 1022A through 1022T. In some aspects, the TX MIMO processor 1020 applies beam-forming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1022A through 1022T are then transmitted from NT antennas 1024A through 1024T, respectively.

At the device 1050, the transmitted modulated signals are received by NR antennas 1052A through 1052R and the received signal from each antenna 2152 is provided to a respective transceiver ("XCVR") 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive ("RX") data processor 1060 then receives and processes the NR received symbol streams from NR transceivers 1054 based on a particular receiver processing technique to provide NT "detected" symbol streams. The RX data processor 1060 then demodulates, deinterleaves, and decodes each detected symbol stream to recover the traffic data for the data stream. The processing performed by the RX data processor 1060 is complementary to that performed by the TX MIMO processor 1020 and the TX data processor 1014 at the device 1010.

A processor 1070 periodically determines which pre-coding matrix to use (discussed below). The processor 1070 formulates a reverse link message comprising a matrix index portion and a rank value portion. A data memory 2172 may store program code, data, and other information used by the processor 1070 or other components of the device 1050.

The reverse link message may comprise various types of information regarding the communication link and/or the received data stream. The reverse link message is then processed by a TX data processor 1038. The TX data processor 1038 also receives traffic data for a number of data streams from a data source 1036. The modulator 1080 modulates the data streams. Further, the transceivers 1054A through 1054R condition the data streams and transmits the data streams back to the device 1010.

At the device 1010, the modulated signals from the device 1050 are received by the antennas 1024. Further, the transceivers 1022 condition the modulated signals. A demodulator ("DEMOD") 1040 demodulates the modulated signals. A RX data processor 1042 processes the demodulated signals and extracts the reverse link message transmitted by the device 1050. The processor 1030 then determines which pre-coding matrix to use for determining the beam-forming weights. Further, the processor 1030 processes the extracted message.

Further, the device 1010 and/or the device 1050 may comprise one or more components that perform interference control operations as taught herein. For example, an interference ("INTER") control component 1090 may cooperate with the processor 1030 and/or other components of the device 1010 to send/receive signals to/from another device (e.g., device 1050) as taught herein. Similarly, an interference control component 1092 may cooperate with the processor 1070 and/or other components of the device 1050 to send/receive signals to/from another device (e.g., device 1010). It should be appreciated that for each device 1010 and 1050 the functionality of two or more of the described components may be provided by a single component. For example, a single processing component may provide the functionality of the interference control component 1090 and the processor 1030. Further, a single processing component may provide the functionality of the interference control component 1092 and the processor 1070.

Figure 11:
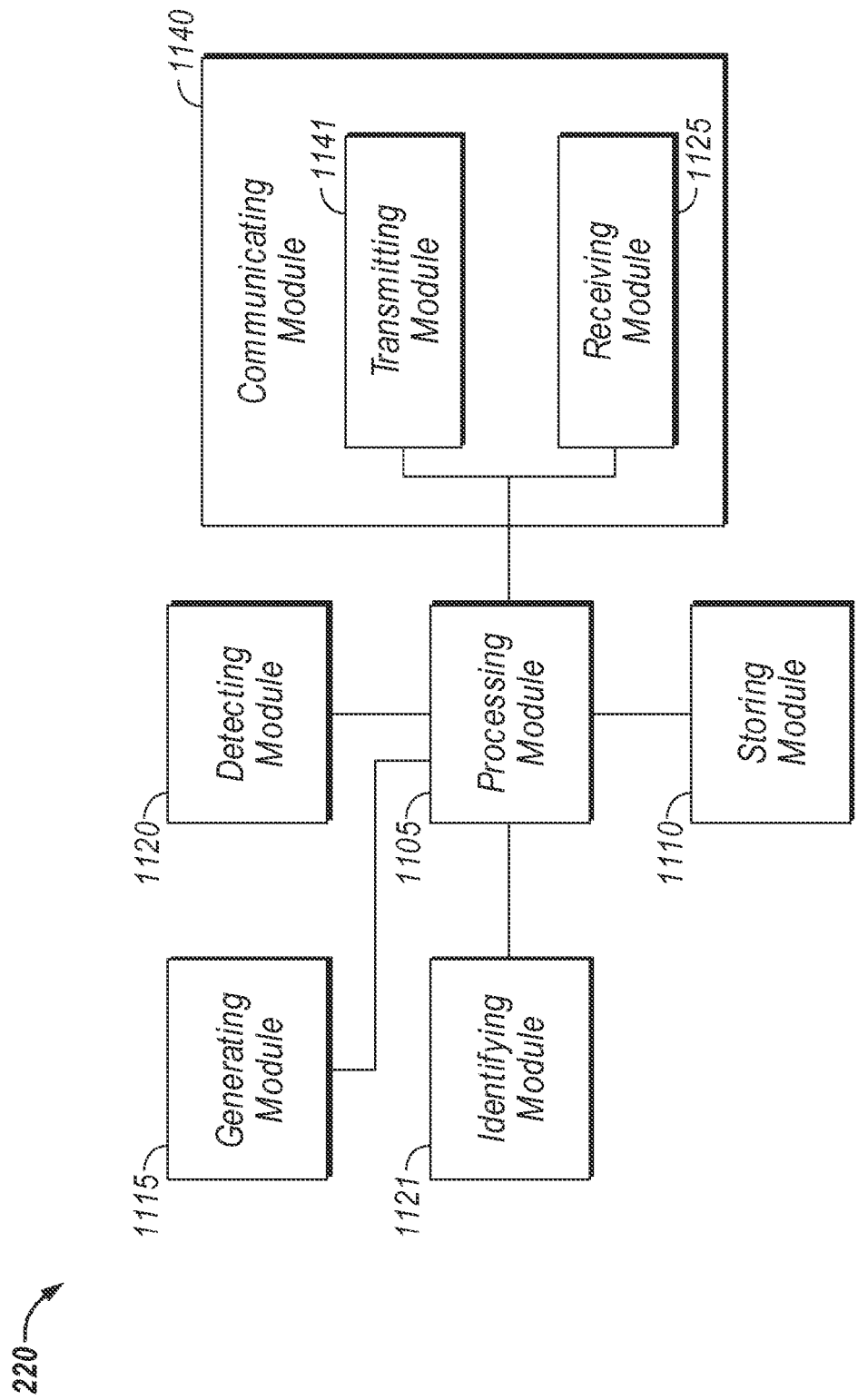
FIG. 11 is a functional block diagram of yet another exemplary access terminal shown in FIG. 2.
Figure 12:
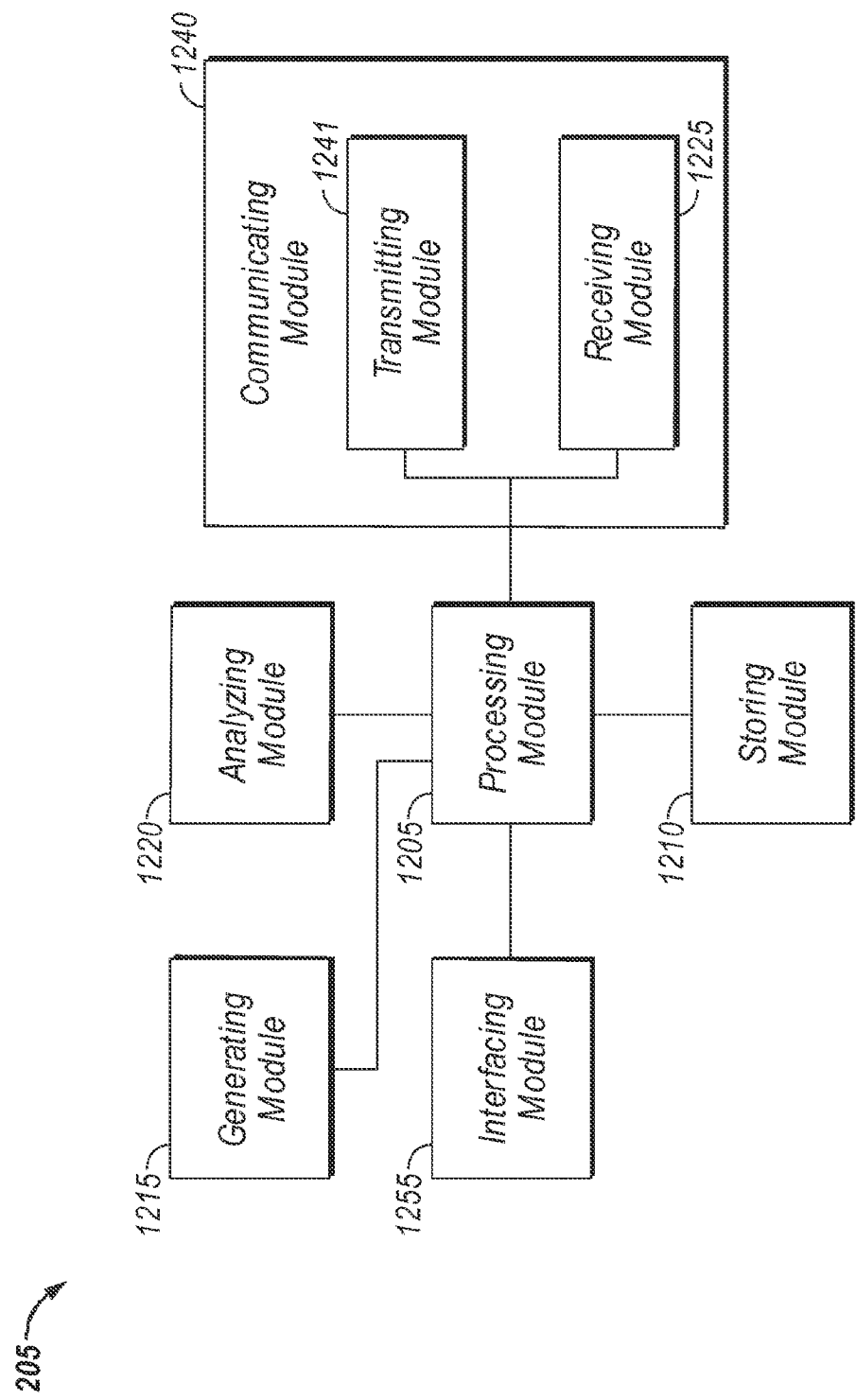
FIG. 12 is a functional block diagram of yet another exemplary macro node shown in FIG. 2.

The functionality described herein (e.g., with regard to one or more of the accompanying figures) may correspond in some aspects to similarly designated "means for" functionality in the appended claims. Referring to FIGS. 11 and 12, the AT 220 and the macro node 205 are represented as a series of interrelated functional modules.

FIG. 11 is a functional block diagram of yet another exemplary access terminal shown in FIG. 2. As shown, the AT 220 may comprise a processing module 1105, a storing module 1110, a generating module 1115, a detecting module 1120, an identifying module 1121, a receiving module 1125, a transmitting module 1141, and a communicating module 1140.

The processing module 1105 may correspond at least in some aspects to, for example, a processor as discussed herein. The storing module 1110 may correspond at least in some aspects to, for example, a memory as discussed herein. The generating module 1115 may correspond at least in some aspects to, for example, a message generator as discussed herein. The detecting module 1120 may correspond at least in some aspects to, for example, a pilot detector as discussed herein. The identifying module 1121 may correspond at least in some aspects to, for example, a pilot detector as discussed herein. The receiving module 1125 may correspond at least in some aspects to, for example, a receiver and/or a handoff controller as discussed herein. The transmitting module 1141 may correspond at least in some aspects to, for example, a transmitter as discussed herein. The communicating module 1140 may correspond at least in some aspects to, for example, a transceiver as discussed herein.

FIG. 12 is a functional block diagram of yet another exemplary macro node shown in FIG. 2. As shown, the macro node 205 may comprise a processing module 1205, a storing module 1210, a generating module 1215, an analyzing module 1220, a receiving module 1225, a transmitting module 1241, a communicating module 1240, and an interfacing module 1255. The processing module 1205 may correspond at least in some aspects to, for example, a processor as discussed herein. The storing module 1210 may correspond at least in some aspects to, for example, a memory as discussed herein. The generating module 1215 may correspond at least in some aspects to, for example, a pilot generator as discussed herein. The analyzing module 1220 may correspond at least in some aspects to, for example, a message analyzer as discussed herein. The receiving module 1225 may correspond at least in some aspects to, for example, a receiver and/or a handoff controller as discussed herein. The transmitting module 1241 may correspond at least in some aspects to, for example, a transmitter as discussed herein. The communicating module 1240 may correspond at least in some aspects to, for example, a transceiver as discussed herein. The interfacing module 1255 may correspond at least in some aspects to, for example, a network interface controller as discussed herein.

The functionality of the modules of FIGS. 11 and 12 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

While the specification describes particular examples of the present invention, those of ordinary skill can devise variations of the present invention without departing from the inventive concept. For example, the teachings herein refer to networks with femto cells and macro cells but are equally applicable to networks with other topologies.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of avoiding interference signals sent by a femto node in a wireless communication system, the method comprising:
    establishing a communication link between a first transceiver and a base station that is configured to provide wireless communication coverage within a first area;
    detecting by the first transceiver a femto signal generated by the femto node that is configured to provide wireless communication coverage within a second area to at least a second transceiver that is different from the first transceiver, wherein the second area is smaller than the first area;
    identifying information indicative of a signal strength of the femto signal;
    transmitting a first message in response to detecting the femto signal, the first message comprising information uniquely identifying the femto node and the information indicative of the signal strength of the femto signal to the base station over a first frequency carrier;
    receiving a second message from the base station in response to the first message, the second message comprising a schedule indicating when to transmit additional messages to the base station, the additional messages comprising information indicative of signal strengths of additional femto signals generated by the femto node at different times;
    receiving a third message from the base station, the third message comprising information indicative of an instruction to switch from communicating with the base station over the first frequency carrier to communicating with the base station over a second frequency carrier; and
    communicating with the base station over the second frequency carrier in response to the third message.

2. The method of claim 1, wherein the femto node is configured to communicate with the base station through the Internet.

3. The method of claim 1, further comprising:
    detecting by the first transceiver a macro signal generated by the base station;
    identifying information indicative of a signal strength of the macro signal; and
    transmitting a fourth message to the base station in response to detecting the macro signal, the fourth message comprising the information indicative of the signal strength of the macro signal.

4. The method of claim 3, wherein the base station is configured to generate the third message if the signal strength of the macro signal is less than a threshold value.

5. The method of claim 1, wherein the base station is configured to generate the third message if the signal strength of the femto signal exceeds a threshold value.

6. The method of claim 1, wherein the base station is configured to generate the third message if the base station identifies the femto node based on the first message.

7. The method of claim 1, further comprising identifying a presence of the femto node based on at least in part the femto signal.

8. The method of claim 7, wherein the femto signal comprises a first pseudo noise offset, and wherein identifying the presence of the femto node comprises determining if the first pseudo noise offset belongs to a set of pseudo noise offsets allocated for use by the femto node and/or one or more additional femto nodes.

9. The method of claim 1, further comprising:
    periodically detecting by the first transceiver the additional femto signals generated by the femto node;
    periodically identifying information indicative of the signal strengths of the additional femto signals; and
    periodically transmitting the additional messages in response to detecting the additional femto signals, each of the additional messages comprising information identifying the femto node and the information indicative of at least one of the signal strengths of the additional femto signals to the base station over the first frequency carrier,
    wherein the base station is configured to generate the third message if at least one of the signal strengths of the additional femto signals exceeds a threshold value.

10. The method of claim 1, wherein the first frequency carrier is separated from the second frequency carrier by at least a bandwidth of the first frequency carrier.

11. The method of claim 1, wherein the information indicative of the signal strength of the femto signal comprises a signal-to-noise ratio.

12. A wireless communication apparatus comprising:
    a transceiver configured to communicate with a base station that is configured to provide wireless communication coverage within a first area;
    a signal detector configured to:
        detect a femto signal generated by a femto node that is configured to provide wireless communication coverage within a second area, wherein the second area is smaller than the first area; and
        identify information indicative of a signal strength of the femto signal;
    a message generator configured to generate a first message in response to detecting the femto signal, the first message comprising information uniquely identifying the femto node and the information indicative of the signal strength of the femto signal, wherein the transceiver is further configured to transmit the first message to the base station over a first frequency carrier and to receive a second message from the base station in response to the first message, the second message comprising a schedule indicating when to transmit additional messages to the base station, the additional messages comprising information indicative of signal strengths of additional femto signals generated by the femto node at different times; and a handoff controller configured to receive a third message from the base station, the third message comprising information indicative of an instruction to switch from communicating with the base station over the first frequency carrier to communicating with the base station over a second frequency carrier, wherein the transceiver is further configured to communicate with the base station over the second frequency carrier in response to the third message.

13. The apparatus of claim 12, wherein the femto node is configured to communicate with the base station through the Internet.

14. The apparatus of claim 12, wherein the signal detector is further configured to detect a macro signal generated by the base station and identify information indicative of a signal strength of the macro signal, and wherein the transceiver is further configured to transmit to the base station a fourth message in response to detecting the macro signal, the fourth message comprising the information indicative of the signal strength of the macro signal.

15. The apparatus of claim 14, wherein the base station is configured to generate the third message if the signal strength of the macro signal is less than a threshold value.

16. The apparatus of claim 12, wherein the base station is configured to generate the third message if the signal strength of the femto signal exceeds a threshold value.

17. The apparatus of claim 12, wherein the base station is configured to generate the third message if the base station identifies the femto node based on the first message.

18. The apparatus of claim 12, wherein the signal detector is further configured to identify a presence of the femto node based on at least in part the femto signal.

19. The apparatus of claim 12, wherein the femto signal comprises a first pseudo noise offset, and wherein the signal detector is further configured to determine if the first pseudo noise offset belongs to a set of pseudo noise offsets allocated for use by the femto node and/or one or more additional femto nodes.

20. The apparatus of claim 12, wherein the signal detector is further configured to periodically detect by the first transceiver the additional femto signals generated by the femto node and periodically identify information indicative of the signal strengths of the additional femto signals, wherein the transceiver is further configured to periodically transmit the additional messages in response to detecting the additional femto signals, each of the additional messages comprising information identifying the femto node and the information indicative of at least one of the signal strengths of the additional femto signals to the base station over the first frequency carrier, and wherein the base station is configured to generate the third message if at least one of the signal strengths of the additional femto signals exceeds a threshold value.

21. The apparatus of claim 12, wherein the first frequency carrier is separated from the second frequency carrier by at least a bandwidth of the first frequency carrier.

22. The apparatus of claim 12, wherein the information indicative of the signal strength of the femto signal comprises a signal-to-noise ratio.

23. A wireless communication apparatus comprising:
means for communicating with a base station that is configured to provide wireless communication coverage within a first area;
means for detecting a femto signal generated by a femto node that is configured to provide wireless communication coverage within a second area, wherein the second area is smaller than the first area; and
means for identifying information indicative of a signal strength of the femto signal;
means for generating a first message in response to detecting the femto signal, the first message comprising information uniquely identifying the femto node and the information indicative of the signal strength of the femto signal; means for transmitting the first message to the base station over a first frequency carrier;
means for receiving a second message from the base station in response to the first message, the second message comprising a schedule indicating when to transmit additional messages to the base station, the additional messages comprising information indicative of signal strengths of additional femto signals generated by the femto node at different times; and
means for receiving a third message from the base station, the third message comprising information indicative of an instruction to switch from communicating with the base station over the first frequency carrier to communicating with the base station over a second frequency carrier, wherein the communication means is further configured to communicate with the base station over the second frequency carrier in response to the third message.

24. The apparatus of claim 23, wherein the femto node is configured to communicate with the base station through the Internet.

25. The apparatus of claim 23, further comprising:
means for detecting by the first transceiver a macro signal generated by the base station;
means for identifying information indicative of a signal strength of the macro signal; and
means for transmitting a fourth message to the base station in response to detecting the macro signal, the fourth message comprising the information indicative of the signal strength of the macro signal.

26. The apparatus of claim 25, wherein the base station is configured to generate the third message if the signal strength of the macro signal is less than a threshold value.

27. The apparatus of claim 23, wherein the base station is configured to generate the third message if the signal strength of the femto signal exceeds a threshold value.

28. The apparatus of claim 23, wherein the base station is configured to generate the third message if the base station identifies the femto node based on the first message.

29. The apparatus of claim 23, further comprising means for identifying a presence of the femto node based on at least in part the femto signal.

30. The apparatus of claim 29, wherein the femto signal comprises a first pseudo noise offset, and wherein the means for identifying the presence of the femto node comprises means for determining if the first pseudo noise offset belongs to a set of pseudo noise offsets allocated for use by the femto node and/or one or more additional femto nodes.

31. The apparatus of claim 23, further comprising:
means for periodically detecting by the first transceiver the additional femto signals generated by the femto node;

means for periodically identifying information indicative of the signal strengths of the additional femto signals; and means for periodically transmitting the additional messages in response to detecting the additional femto signals, each of the additional messages comprising information identifying the femto node and the information indicative of at least one of the signal strengths of the additional femto signals to the base station over the first frequency carrier, wherein the base station is configured to generate the third message if at least one of the signal strengths of the additional femto signals exceeds a threshold value.

32. The apparatus of claim 23, wherein the first frequency carrier is separated from the second frequency carrier by at least a bandwidth of the first frequency carrier.

33. The apparatus of claim 23, wherein the information indicative of the signal strength of the femto signal comprises a signal-to-noise ratio.

34. A computer program product, comprising:
non-transitory computer-readable medium comprising:
code for causing a computer to establish a communication link between a first transceiver and a base station that is configured to provide wireless communication coverage within a first area;
code for causing a computer to detect by the first transceiver a femto signal generated by the femto node that is configured to provide wireless communication coverage within a second area to at least a second transceiver that is different from the first transceiver, wherein the second area is smaller than the first area;
code for causing a computer to identify information indicative of a signal strength of the femto signal;
code for causing a computer to transmit a first message in response to detecting the femto signal, the first message comprising information uniquely identifying the femto node and the information indicative of the signal strength of the femto signal to the base station over a first frequency carrier;
coder for causing the computer to receive a second message from the base station in response to the first message, the second message comprising a schedule indicating when to transmit additional messages to the base station, the additional messages comprising information indicative of signal strengths of additional femto signals generated by the femto node at different times;
code for causing a computer to receive a third message from the base station, the third message comprising information indicative of an instruction to switch from communicating with the base station over the first frequency carrier to communicating with the base station over a second frequency carrier; and
code for causing a computer to communicate with the base station over the second frequency carrier in response to the third message.

35. The computer program product of claim 34, wherein the femto node is configured to communicate with the base station through the Internet.

36. The computer program product of claim 34, wherein the computer-readable medium further comprises:
code for causing a computer to detect by the first transceiver a macro signal generated by the base station;
code for causing a computer to identify information indicative of a signal strength of the macro signal; and
code for causing a computer to transmit a fourth message to the base station in response to detecting the macro signal, the fourth message comprising the information indicative of the signal strength of the macro signal.

37. The computer program product of claim 36, wherein the base station is configured to generate the third message if the signal strength of the macro signal is less than a threshold value.

38. The computer program product of claim 34, wherein the base station is configured to generate the third message if the signal strength of the femto signal exceeds a threshold value.

39. The computer program product of claim 34, wherein the base station is configured to generate the third message if the base station identifies the femto node based on the first message.

40. The computer program product of claim 34, wherein the computer-readable medium further comprises code for causing a computer to identify a presence of the femto node based on at least in part the femto signal.

41. The computer program product of claim 40, wherein the femto signal comprises a first pseudo noise offset, and wherein the code for causing a computer to identify the presence of the femto node comprises code for causing a computer to determine if the first pseudo noise offset belongs to a set of pseudo noise offsets allocated for use by the femto node and/or one or more additional femto nodes.

42. The computer program product of claim 34, wherein the computer-readable medium further comprises:
code for causing a computer to periodically detect by the first transceiver the additional femto signals generated by the femto node;
code for causing a computer to periodically identify information indicative of the signal strengths of the additional femto signals; and
code for causing a computer to periodically transmit the additional messages in response to detecting the additional femto signals, each of the additional messages comprising information identifying the femto node and the information indicative of at least one of the signal strengths of the additional femto signals to the base station over the first frequency carrier,
wherein the base station is configured to generate the third message if at least one of the signal strengths of the additional femto signals exceeds a threshold value.

43. The computer program product of claim 34, wherein the first frequency carrier is separated from the second frequency carrier by at least a bandwidth of the first frequency carrier.

44. The computer program product of claim 34, wherein the information indicative of the signal strength of the femto signal comprises a signal-to-noise ratio.

* * * * *